United States Patent
Choi et al.

(10) Patent No.: US 12,414,142 B2
(45) Date of Patent: Sep. 9, 2025

(54) METHOD AND DEVICE FOR TRANSMITTING/RECEIVING SIGNAL IN WIRELESS COMMUNICATION SYSTEM

(71) Applicant: LG Electronics Inc., Seoul (KR)

(72) Inventors: Seunghwan Choi, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 17/713,783

(22) Filed: Apr. 5, 2022

(65) Prior Publication Data

US 2022/0353879 A1    Nov. 3, 2022

(30) Foreign Application Priority Data

Apr. 5, 2021  (KR) .................. 10-2021-0044181
Apr. 19, 2021  (KR) .................. 10-2021-0050525
(Continued)

(51) Int. Cl.
*H04W 72/542* (2023.01)
*H04L 1/1812* (2023.01)
(Continued)

(52) U.S. Cl.
CPC ......... *H04W 72/542* (2023.01); *H04L 1/1812* (2013.01); *H04L 5/0048* (2013.01);
(Continued)

(58) Field of Classification Search
CPC ... H04W 72/542; H04W 72/23; H04W 24/10; H04L 5/0055
See application file for complete search history.

(56) References Cited

U.S. PATENT DOCUMENTS

2023/0171070 A1* 6/2023 Bhamri ............... H04L 1/08
                                                                370/329
2023/0269612 A1* 8/2023 Muruganathan ...... H04L 1/0027
                                                                370/252
2023/0362914 A1* 11/2023 He .................... H04W 72/0446

FOREIGN PATENT DOCUMENTS

KR    10-2018-0135862    12/2018
KR    10-2019-0068422     6/2019
(Continued)

OTHER PUBLICATIONS

3GPP, "3rd Generation Partnership Project; Technical Specification Group Radio Access Network; NR; Physical layer procedures for data (Release 16)," TS 38.214 V16.5.0, Mar. 2021, 171 pages.
(Continued)

*Primary Examiner* — Kevin M Cunningham
(74) *Attorney, Agent, or Firm* — Fish & Richardson P.C.

(57) ABSTRACT

The method and apparatus for transmitting and receiving a signal in a wireless communication system disclosed herein operate based on a timeline configuration different from that in the prior art. Specifically, a timeline related to physical downlink control channel (PDCCH) reception, physical downlink shared channel (PDSCH) reception, and hybrid automatic repeat request acknowledgement (HARQ-ACK) transmission, a timeline related to PDCCH reception and physical uplink shared channel (PUSCH) transmission, and a timeline related to PDCCH reception, channel state information reference signal (CSI-RS) reception, channel state information (CSI) reporting may be modified for a subcarrier spacing (SCS) configuration of 5 or 6.

16 Claims, 9 Drawing Sheets

(30) Foreign Application Priority Data

| | | | |
|---|---|---|---|
| Aug. 18, 2021 | (KR) | ........................ | 10-2021-0108905 |
| Sep. 30, 2021 | (KR) | ........................ | 10-2021-0130351 |
| Oct. 29, 2021 | (KR) | ........................ | 10-2021-0147079 |
| Jan. 7, 2022 | (KR) | ........................ | 10-2022-0002988 |

(51) Int. Cl.
    *H04L 5/00*           (2006.01)
    *H04W 24/10*        (2009.01)
    *H04W 72/23*        (2023.01)

(52) U.S. Cl.
    CPC ........... *H04L 5/0055* (2013.01); *H04W 24/10* (2013.01); *H04W 72/23* (2023.01)

(56) References Cited

FOREIGN PATENT DOCUMENTS

| | | |
|---|---|---|
| KR | 20190062294 | 6/2019 |
| WO | WO2019214668 | 11/2019 |
| WO | WO2020033937 | 2/2020 |
| WO | WO2021038429 | 3/2021 |

OTHER PUBLICATIONS

International Search Report in International Appln. No. PCT/KR2022/004659, mailed on Jul. 21, 2022, 9 pages.

Lenovo, Motorola Mobility, "PDSCH/PUSCH scheduling enhancements for NR from 52.6 GHz to 71GHz," 3GPP TSG RAN WG1 #106-e, R1-2106835, e-meeting, Aug. 16-27, 2021, 14 pages.

Moderator (vivo), "Discussion summary #3 of [106-e-NR-52-71GHz-05]," 3GPP TSG RAN WG1 Meeting #106-e R1-2108487, E-meeting, Aug. 16-27, 2021, 98 pages.

Nokia, Nokia Shanghai Bell, "PDSCH/PUSCH enhancements," 3GPP TSG RAN WG1 #104bis-e, R1-2102562, e-Meeting, Apr. 12-20, 2021, 29 pages.

Notice of Allowance in Korean Appln. No. 10-2023-7012611, mailed on Sep. 21, 2023, 4 pages (with English translation).

FutureWEI, "Considerations for higher SCS support in beyond 52.6GHz," 3GPP TSG RAN WG1 #104-e, R1-2100050, e-Meeting, Jan. 25-Feb. 5, 2021, 16 pages.

LG Electronics, "PDSCH/PUSCH enhancements to support NR above 52.6 GHZ," 3GPP TSG RAN WG1 #104-e, R1-2100896, e-Meeting, Jan. 25-Feb. 5, 2021, 14 pages.

Moderator (Intel Corporation), "[103-e-NR-52-71-Waveform-Changes] Discussions Summary #4," 3GPP TSG RAN WG1 Meeting #103-e, R1-2009688, e-Meeting, Oct. 26-Nov. 13, 2020, 153 pages.

Ericsson, "Maintenance for CSI acquisition," R1-1809196, 3GPP TSG RAN WG1, Meeting #94, Goteborg, Sweden, Aug. 20-24, 2018, 9 pages.

Extended European Search Report in European Appln. No. 22784867.8, mailed on Oct. 14, 2024, 5 pages.

\* cited by examiner

| 120k slot | 0 | | | | | | | | 1 | | | | | | | |
|---|---|---|---|---|---|---|---|---|---|---|---|---|---|---|---|---|
| 960k slot | 0 | 1 | 2 | 3 | 4 | 5 | 6 | 7 | 8 | 9 | 10 | 11 | 12 | 13 | 14 | 15 |

FIG. 7

METHOD AND DEVICE FOR TRANSMITTING/RECEIVING SIGNAL IN WIRELESS COMMUNICATION SYSTEM

CROSS-REFERENCE TO RELATED APPLICATIONS

This application claims the benefit of Korean Application Nos. 10-2022-0002988, filed on Jan. 7, 2022, 10-2021-0147079, filed on Oct. 29, 2021, 10-2021-0137756, filed on Oct. 15, 2021, 10-2021-0130351, filed on Sep. 30, 2021, 10-2021-0108905, filed on Aug. 18, 2021, 10-2021-0050525, filed on Apr. 19, 2021, and 10-2021-0044181, filed on Apr. 5, 2021. The disclosures of the prior applications are incorporated by reference in their entirety.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a signal transmission and reception method for efficiently transmitting and receiving control and data signals in a wireless communication system and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

In an aspect of the present disclosure, there is provided a method of transmitting and receiving a signal by a user equipment (UE) operating in a wireless communication system. The method may include: receiving a physical downlink control channel (PDCCH) triggering an aperiodic channel state information (CSI) report; receiving a channel state information reference signal (CSI-RS) based on the PDCCH; and transmitting a physical uplink shared channel (PUSCH) including the CSI report based on a measurement result of the CSI-RS. A first subcarrier spacing (SCS) configuration, a second SCS configuration, and a third SCS configuration may be used for the PDCCH, the CSI-RS, and the PUSCH, respectively. CSI computation delay requirement 1 may require a lower delay than CSI computation delay requirement 2 for a same SCS configuration. CSI computation delay requirement 2 may be used based on (i) the PUSCH not including a transport block (TB) or a hybrid automatic repeat request acknowledgement (HARQ-ACK), (ii) there being no CSI processing unit (CPU) occupied by the UE, and (iii) at least one of the first SCS configuration, the second SCS configuration, or the third SCS configuration being 5 or 6.

In another aspect of the present disclosure, there are provided an apparatus, a processor, and a storage medium for performing the signal transmission and reception method.

The apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to one embodiment of the present disclosure, when control and data signals are transmitted and received between communication devices, the signals may be transmitted and received more efficiently based on operations different from those in the prior art It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 5 illustrates a physical uplink shared channel (PUSCH) transmission process.

FIGS. 6 to 9 are diagrams illustrating uplink (UL) channel transmission according to the embodiments of the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16

(worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
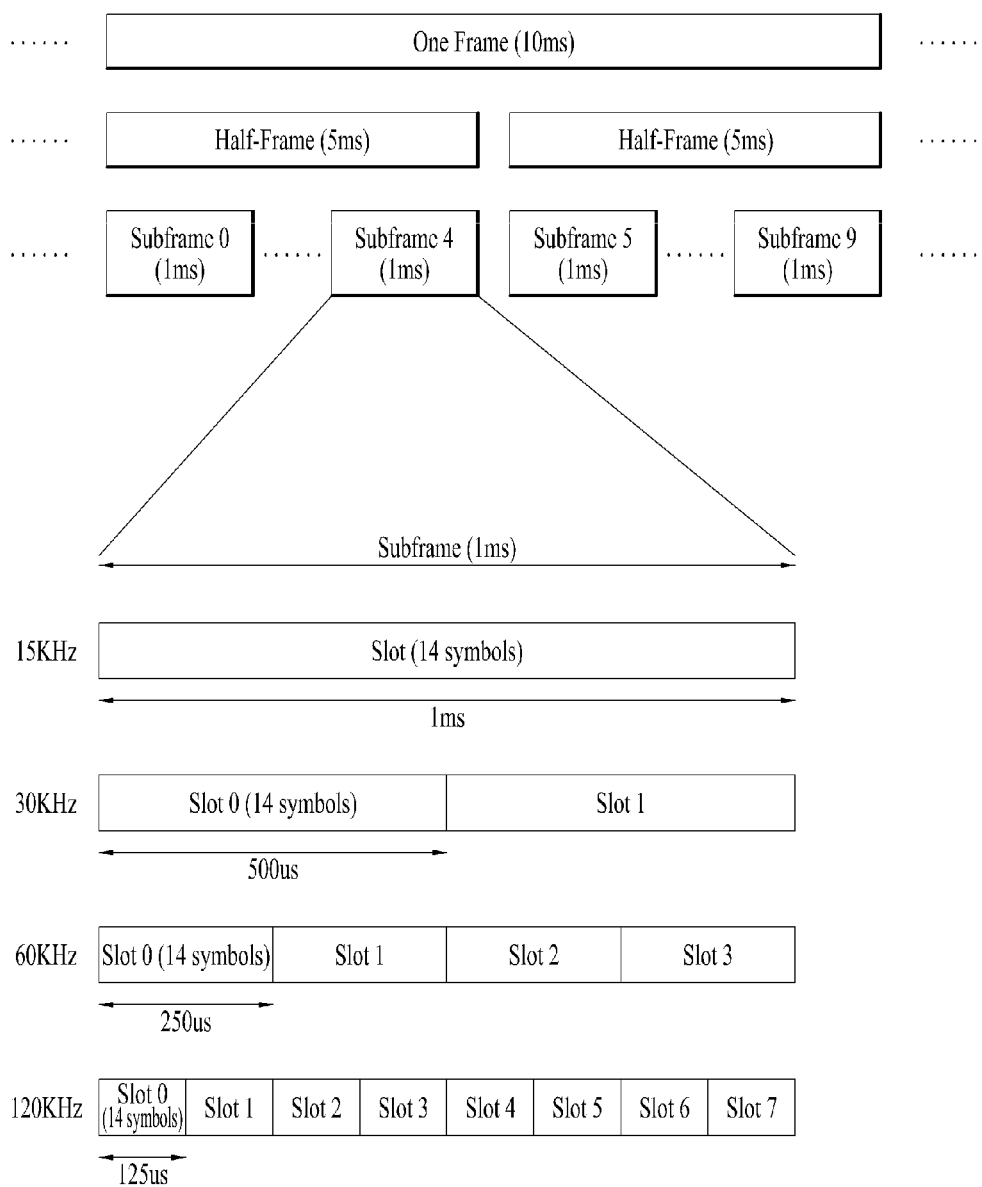
FIG. 1 illustrates a radio frame structure.

3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz - 7125 MHz | 15, 30, 60 kHz |
| FR2 | 24250 MHz - 52600 MHz | 60, 120, 240 kHz |

Figure 2:
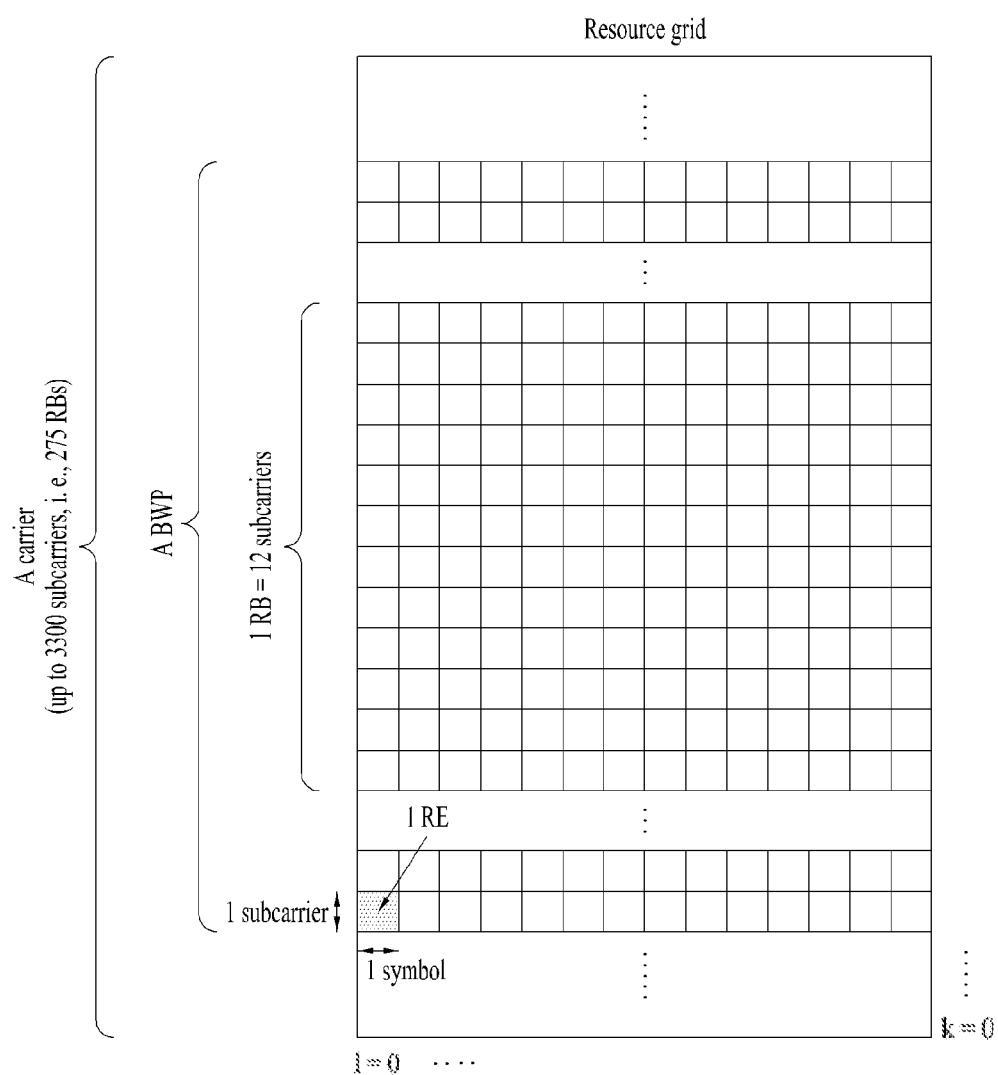
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A plurality of RB interlaces (simply, interlaces) may be defined in the frequency domain. Interlace m∈{0, 1, . . . , M−1} may be composed of (common) RBs {m, M+m, 2M+m, 3M+m, . . . }. M denotes the number of interlaces. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
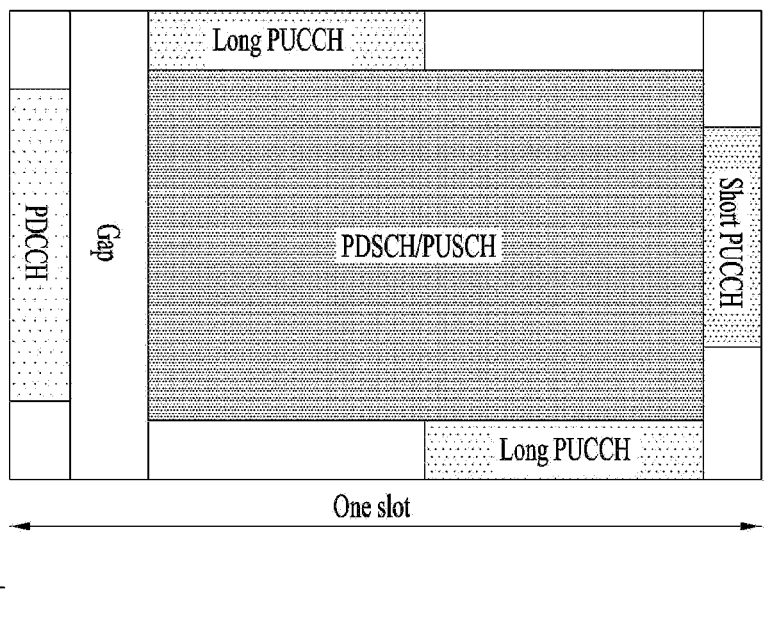
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

UL Physical Channels/Signals (1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (NACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 4 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 4

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)
  Supportable UCI payload size: up to K bits (e.g., K=2)
  Number of OFDM symbols included in one PUCCH: 1 to X symbols (e.g., X=2)
  Transmission structure: only a UCI signal is configured with no DM-RS, and a UCI state is transmitted by selecting and transmitting one of a plurality of sequences.

(1) PUCCH Format 1 (PF1)
  Supportable UCI payload size: up to K bits (e.g., K=2)
  Number of OFDM symbols included in one PUCCH: Y to Z symbols (e.g., Y=4 and Z=14)
  Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).

(2) PUCCH Format 2 (PF2)
  Supportable UCI payload size: more than K bits (e.g., K=2)

Number of OFDM symbols included in one PUCCH: 1 to X symbols(e.g., X=2)

Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT.

(3) PUCCH Format 3 (PF3)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.

(4) PUCCH Format 4 (PF4 or F4)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. The DFT is applied to encoded UCI bits with no multiplexing between UEs.

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 5 shows DCI formats transmitted over the PDCCH.

TABLE 5

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 6 shows the usage of the PDCCH and transport channels according to the type of RNTI. Here, the transport channel means a transport channel related to data carried by a PDSCH/PUSCH scheduled by the PDCCH.

TABLE 6

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |

TABLE 6-continued

| RNTI | Usage | Transport Channel |
|---|---|---|
| Temporary C-RNTI | Contention Resolution (when no valid C-RNTI is available) | DL-SCH |
| Temporary C-RNTI | Msg3 transmission | UL-SCH |
| C-RNTI, MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configured Scheduling)-RNTI | Configured scheduled unicast transmission (activation, reactivation and retransmission) | DL-SCH, UL-SCH |
| CS-RNTI | Configured scheduled unicast transmission (deactivation) | N/A |
| TPC(Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Format Indication on the given cell | N/A |
| SP(Semi-persistent)-CSI(Channel State Information)-RNTI | Activation of Semi-persistent CSI reporting an PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.

controlResourceSetId: this parameter/information indicates the identifier (ID) of the CORESET.

frequencyDomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.

duration: this parameter/information indicates time-domain resources of the CORESET. The parameter/information duration may indicate the number of consecutive OFDMA symbols included in the CORESET. For example, duration has a value of 1-3.

cce-REG-MappingType: this parameter/information indicates a CCE-to-REG mapping type. An interleaved type and a non-interleaved type may be supported.

precoderGranularity: this parameter/information indicates a precoder granularity in the frequency domain.

tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.

tci-PresentInDCI: this parameter/information indicates whether a TCI field is included in DCI.

pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 7 shows PDCCH search spaces.

TABLE 7

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |

TABLE 7-continued

| Search Space | Type | RNTI | Use Case |
|---|---|---|---|
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

searchSpaceId: this parameter/information indicates the ID of the SS set.

controlResourceSetId: this parameter/information indicates the CORESET associated with the SS set.

monitoringSlotPeriodicityAndOffset: this parameter/information indicates a PDCCH monitoring periodicity (in a unit of slot) and a PDCCH monitoring offset (in a unit of slot)

monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.

nrofCandidates: this parameter/information indicates the number of PDCCH candidates (e.g., one of 0, 1, 2, 3, 4, 5, 6, and 8) for each AL (where AL={1, 2, 4, 8, 16}).

searchSpaceType: this parameter/information indicates whether the SS type is the CSS or USS.

DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

Figure 4:
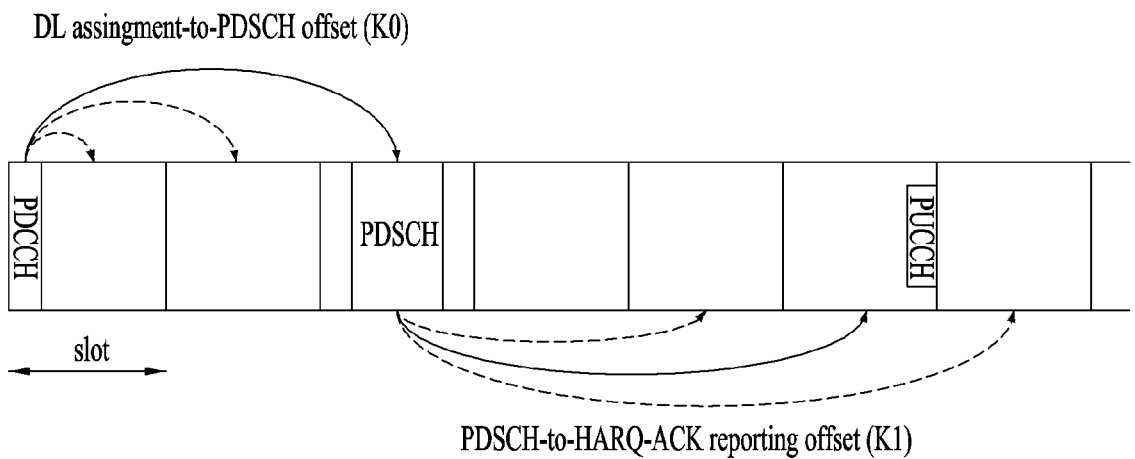
FIG. 4 illustrates an acknowledgment/negative acknowledgment (ACK/NACK) transmission process.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g., OFDM symbol index) and length (e.g., the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Figures 5, 6:
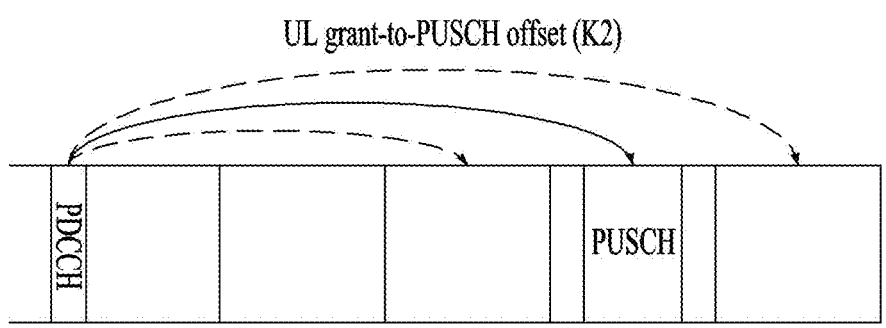

FIG. 5 illustrates an exemplary PUSCH transmission process. Referring to FIG. 5, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

1. Timeline in High Frequency Band

The above contents are applicable in combination with methods proposed in the present disclosure, which will be described later. Alternatively, the contents may clarify the technical features of the methods proposed in the present disclosure.

In addition, the following methods may be equally applied to the above-described NR system or shared spectrum (licensed bands). Thus, it is obvious that the terms, expressions, and structures in this document may be modified to be suitable for the system in order to implement the technical idea of the present disclosure in the corresponding system.

The NR system supports various numerologies (or SCSs) to provide various 5G services. For example, the NR system may support a wide area in conventional cellular bands with an SCS of 15 kHz and support a dense urban area and a wide carrier bandwidth with lower latency with an SCS of 30/60 kHz. For an SCS above 60 kHz, NR may support a bandwidth of 24.25 GHz or higher. According to Release 16, NR frequency bands are divided into two frequency ranges (FR1 and FR2), which may be configured as shown in Table 3. In addition, discussions are ongoing to support future NR systems operating above frequency bands defined in FR1/FR2 (for example, 52.6 GHz to 71 GHz).

Frequency bands above FR1 and FR2 (e.g., bands from 52.6 GHz to 114.25 GHz, and more particularly, bands from 52.6 GHz to 71 GHz) may be referred to as FR2-2. The waveforms, SCSs, CP lengths, timings, etc. defined for FR1 and FR2 in the current NR system may not be applied to FR2-2.

An SCS of 120, 480, or 960 kHz may be used for NR operation in bands above 52.6 GHz. For the newly introduced 480 and 960 kHz SCS, the length of an OFDM symbol becomes shorter than that of 120 kHz SCS (e.g., ¼ times for 480 kHz and ⅛ times for 960 kHz). Due to the shortened symbol and slot lengths, there may be various changes in timelines such as a PDCCH/PDSCH processing time and a PDSCH/PUSCH preparation time. In addition, since the effect of phase noise becomes large due to band characteristics, the time for the UE to compensate for additional inter-carrier interference (ICI) may increase when the UE decodes a PDSCH. On the other hand, due to newly introduced operations such as multi-PDSCH scheduling by single DCI, the PDCCH processing time may increase. In addition, it is expected there will be a change in configuring the time (K1) (the number of symbols and/or the number of slots) required for PDSCH-to-HARQ-ACK. To reduce the burden of implementation complexity of the UE due to the shortened symbol/slot time, it may be necessary to change the timelines. Accordingly, a PDSCH processing time (N1), a PUSCH preparation time (N2), and a HARQ-ACK processing time (N3) may need to be changed for NR operation in the corresponding bands. A slot offset from DL grant reception to PDSCH reception (K0), a slot offset from PDSCH reception to HARQ-ACK transmission (K1), and a slot offset from UL grant reception to PUSCH transmission (K2) may also need to be changed. Additionally, it may be necessary to change a timeline between DCI (or PDCCH) triggering a CSI-RS, a CSI-RS and/or CSI-IM signal transmitted by a trigger, and/or a UL channel including a CSI report.

In this specification, newly introduced SCSs (e.g., 480 and 960 kHz), changes in timelines due to shortened symbol/slot lengths, and specific methods of configuring the values of K0, K1, and K2 will be described for NR operation in high-frequency and wide bands (e.g., above 52.6 GHz). In addition, a timeline between DCI triggering a CSI-RS, a CSI-RS/IM signal related thereto, and a PUSCH for transmitting the corresponding CSI report will be described.

1.1. Method of Changing Range of K1 Values Suitable for Range of N1 Values 1.1.1-1. DCI Format 1_0

When a PDSCH is scheduled by DCI format 1_0, a PDSCH-to-HARQ_feedback timing indicator field may indicate one of the following values: {1, 2, 3, 4, 5, 6, 7, 8} with three bits. The PDSCH-to-HARQ_feedback timing indicator field may be referred to as a K1 field. A slot gap between the last slot of the PDSCH received by the UE and a PUCCH (or PUSCH) slot for transmitting a HARQ-ACK related to the PDSCH may be represented by the indicated value. Meanwhile, the UE may report the time required for PDSCH reception, PDSCH decoding, and HARQ-ACK processing to the BS. Assuming that the time required for the UE to perform the PDSCH reception, PDSCH decoding, and HARQ-ACK processing is N1, N1 may be represented in units of symbols. Upon receiving the N1 value, the BS configures a slot offset between the PDSCH and the PUCCH (or PUSCH including the HARQ-ACK for the PDSCH) by setting a PDSCH-to-HARQ_feedback value more than or equal to the corresponding absolute time. When a high SCS (e.g., 480 or 960 kHz) is configured in the 52.6 GHz band, the slot length is significantly reduced. In this case, since the UE requires a long time to prepare the HARQ-ACK after receiving the PDSCH, "1" of the following values: {1, 2, 3, 4, 5, 6, 7, 8} in the K1 field may be unavailable.

Table 8 shows the values of N1, which were defined in Table 5.3-1: PDSCH processing time for PDSCH processing capability 1 of conventional 3GPP 38.214.

TABLE 8

| | PDSCH decoding time $N_1$ [symbols] | |
| --- | --- | --- |
| $\mu$ | dmrs-AdditionalPosition = 'pos0' in DMRS-DownlinkConfig in both of dmrs-DownlinkForPDSCH-MappingTypeA, dmrs-DownlinkForPDSCH-MappingTypeB | dmrs-AdditionalPosition ≠ 'pos0' in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

If the SCS (or numerology) is 960 kHz (µ6), N1 may have a value far exceeding 20. For example, when N1>28, values less than or equal to 2 among the PDSCH-to-HARQ_feedback field values may not be necessary. Therefore, depending on the value of N1, a method of differently interpreting the HARQ_feedback field to indicate additionally requested values rather than unnecessary values may be useful. According to the following two methods, K1 may be set to another value instead of a small value that is not used depending on N1 while using the PDSCH-to-HARQ_feedback field as it is (that is, without increasing the value and bitwidth).

$$1.1-(1) K1 = \left\lceil \frac{N1}{c} \right\rceil + PDSCH\text{-to-}HARQ\_$$

feedback timing indicator field value (hereinafter, $$\left\lceil \frac{N1}{c} \right\rceil$$

is denoted by ceil (N1/c))

$$1.1-(2) K1 = \left\lfloor \frac{N1}{c} \right\rfloor + PDSCH\text{-to-}HARQ\_$$

feedback timing indicator field value (hereinafter, $$\left\lfloor \frac{N1}{c} \right\rfloor$$

is denoted by floor (N1/c))

In Sections 1.1-(1) and 1.1-(2), c may be semi-statically configured by RRC, a MAC CE, etc. Alternatively, c may be dynamically configured by DCI. As the default value of c, 14, which is the number of symbols per slot, may be used. The method of determining K1 described in Section 1.1-(1) may be a method of adding the smallest integer more than or equal to N1/c to the K1 field values based on the ceil function, and the method of determining K1 described in Section 1.1-(2) may be a method of adding the largest integer less than or equal to N1/c to the K1 field values based on the floor function. When N1 is a multiple of c, the K1 field values determined as described in Sections 1.1-(1) and 1.1-(2) are the same. As a specific example, according to Section 1.1-(2), when c=14, the values of K1 may be determined based on the range of the N1 values as follows.

If N1 is less than 14, K1={1, 2, 3, 4, 5, 6, 7, 8}.

If N1 is more than or equal to 14 and less than 28, K1={2, 3, 4, 5, 6, 7, 8, 9}.

If N1 is more than or equal to 28 and less than 42, K1={3, 4, 5, 6, 7, 8, 9, 10}.

. . .

Alternatively, when c=14, if Method 1.1-(1) is used, the values of K1 may be determined according to N1 as follows.

If N1 is less than or equal to 14, K1={2, 3, 4, 5, 6, 7, 8, 9}

If N1 is more than 14 and less than or equal to 28, K1={3, 4, 5, 6, 7, 8, 9, 10}

If N1 is more than 28 and less than or equal to 42, K1={4, 5, 6, 7, 8, 9, 10, 11}

. . .

1.1.1-2. DCI format 1_1 and DCI format 1_2

When a PDSCH is scheduled by a DCI format other than DCI format 1_0 or when SPS PDSCH release is scheduled by DCI, the number of bits (bitwidth) of the K1 field and the values thereof may be determined based on dl-DataToUL-ACK, dl-DataToUL-ACK-r16, or dl-DataToUL-ACK-ForDCIFormat 1_2 configured by PUCCH-Config, which is an RRC information element (IE). In this case, the values of K1 may be configured by adding ceil (N1/c) or floor (N1/c) to the K1 field values according to Methods 1.1-(1) and 1.1-(2), which are to calculate K1 described above in Section 1.1.1-1.

1.1.1-3. A Case in Which There is no PDSCH-to-HARQ_Feedback Timing Indicator Field in a DCI Format If there is no K1 field in a DCI format for scheduling a PDSCH or SPS PDSCH release, dl-DataToUL-ACK, dl-DataToUL-ACK-r16, or dl-DataToUL-ACKForDCIFormat 1_2 configured by the RRC IE, PUCCH-Config may be used to configure K1. In this case, the values of K1 may be configured by adding ceil (N1/c) or floor (N1/c) to values indicated by dl-DataToUL-ACK, dl-DataToUL-ACK-r16, or dl-DataToUL-ACKForDCIFormat 1_2 as described in Section 1.1.1-1.

1.1.1-4. SPS PDSCH Reception

Even when the K1 field exists in a DCI format for activating SPS PDSCH reception, the offset between an SPS PDSCH reception ending slot and a PUCCH transmission slot may increase by adding X to the K1 field values. In this case, X may be defined by ceil (N1/c) or floor (N1/c) as described in Section 1.1.1-1, and the value of c may be configured by RRC/DCI, etc. Alternatively, the value of X may be predefined as a specific number without use of N1 and c, or the value of X may be configured by higher layer signaling such as RRC.

Methods 1.1.1-1 to 1.1.1-4 may be configured to operate only for a specific SCS (e.g., 480 or 960 kHz). In addition, Methods 1.1.1-1 to 1.1.1-4 may be configured to operate only when N1 is more than or equal to (or more than) a specific value. Additionally, Methods 1.1-(1) and 1.1-(2) described in Section 1.1.1-1 may be configured based on different values of c, and the configuration of K1 may switch according to Methods 1.1-(1) and 1.1-(2). In this case, a switch flag may be indicated by DCI.

When Methods of 1.1.1-1 to 1.1.1-4 are applied, N1 (for 480 and/or 960 kHz SCS) may have two different values depending on the value of dmrs-AdditionalPosition. If dmrs-AdditionalPosition='pos0' in DMRS-DownlinkConfig, a relatively aggressive (short) processing time may be applied. If dmrs-AdditionalPosition≠'pos0' or if no higher layer parameter is configured, a relative processing time may be applied.

For example, for the 480 and/or 960 kHz SCS used in FR2-2 bands, N1 may be defined to have two different values depending on the dmrs-AdditionalPosition value as shown in Table 9.

Table 9 shows N1 values newly defined for the 480 and/or 960 kHz SCS used in FR2-2 bands in relation to Table 5.3-1: PDSCH processing time for PDSCH processing capability 1 of 3GPP 38.214.

TABLE 9

| | PDSCH decoding time $N_1$ [symbols] | |
|---|---|---|
| μ | dmrs-AditionalPosition = pos0 in DMRS-DownlinkConfig in both of dmrs-DownlinkForPDSCH-MappingTypeA, dmrs-DownlinkForPDSCH-MappingTypeB | dmrs-AditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 3 (120 kHz) | 20 | 24 |
| 5 (480 kHz) | 80 | 96 |
| 6 (960 kHz) | 160 | 192 |

Accordingly, ceil (N1/c) or floor (N1/c) described in the proposed methods in Sections 1.1.1-1 to 1.1.1-4 may be applied by selecting one of two different N1 values, which are newly defined (according to the following methods).

Method 1.1.2-1: As the first method, N1 used in ceil (N1/c) or floor (N1/c) may be selected according to the dmrs-AdditionalPosition value in the same way as the condition that N1 is distinguished by two different values.

That is, when ceil (N1/c) or floor (N1/c) is calculated in Methods 1.1.1-1 to 1.1.1-4, if 'dmrs-AdditionalPosition=pos0 in DMRS-DownlinkConfig in both of dmrs-DownlinkForPDSCH-MappingTypeA and dmrs-DownlinkForPDSCH-MappingTypeB', the N1 values in the left of Table 9 may be used. If 'dmrs-AdditionalPosition≠pos0 in DMRS-DownlinkConfig in either of dmrs-DownlinkForPDSCH-MappingTypeA or dmrs-DownlinkForPDSCH-MappingTypeB or if the higher layer parameter is not configured', the N1 values in the right of Table 9 may be used. As two different values of N1 are defined according to the configuration of an additional DMRS, the offset for K1 (or K1) may be determined based on the smaller one of the two N1 values for a PDSCH in which no additional DMRS is configured/used. For a PDSCH in which the additional DMRS is configured/used, the offset for K1 (or PDSCH-to-HARQ_feedback timing indicator) may be determined based on the larger one of the two N1 values. In this case, the latter (e.g., the N1 values in the right of Table 9) may be used as default values. In other words, since the default configuration of dmrs-AdditionalPosition is pos2, the default values of K1 (or PDSCH-to-HARQ_feedback timing indicator) may also be determined based on N1 when the default value of dmrs-AdditionalPosition is used.

Method 1.1.2-2: As the second method, the larger one of the two N1 values may be used regardless of the dmrs-AdditionalPosition value. In an embodiment, the offset for K1 (or PDSCH-to-HARQ_feedback timing indicator) in Methods 1.1.1-1 to 1.1.1-4 may be determined as floor (24/14) for the 120 kHz SCS, floor (96/14) for the 480 kHz SCS, and floor (192/14) for the 960 kHz SCS (based on the N1 values of Table 9), regardless of the dmrs-AdditionalPosition value. Alternatively, the offset may be determined based on the ceil function instead of the floor function.

Method 1.1.2-3: As the third method, the smaller one of the two N1 values may be used regardless of the dmrs-AdditionalPosition value. In an embodiment, the offset for K1 (or PDSCH-to-HARQ_feedback timing indicator) in Methods 1.1.1-1 to 1.1.1-4 may be determined as floor (20/14) for the 120 kHz SCS, floor (80/14) for the 480 kHz SCS, and floor (160/14) for the 960 kHz SCS (based on the N1 values of Table 9), regardless of the dmrs-AdditionalPosition value. Alternatively, the offset may be determined based on the ceil function instead of the floor function.

When PDSCH scheduling is performed based on DCI format 1_0, values defined by three bits of the K1 field (PDSCH-to-HARQ_feedback timing indicator field) may be defined as new values rather than the following values of the legacy communication system: {1, 2, 3, 4, 5, 6, 7, 8}. For example, some of the 8 conventional values may be defined by adding an offset as proposed in Section 1.1, and the other values may be defined by scaling the current values. Alternatively, the K1 field values may be determined as maximum values (large values) or minimum values (small values) among the values determined by the offset and the values determined by the scaling. In an embodiment, ceil (N1/14) may be used as the offset (in this case, the N1 value may vary depending on the SCS and/or additional DMRS configuration) (in this example, it is assumed that N1=96 for 480 kHz and N1=192 for 960 kHz, that is, ceil (N1/14)=7 for 480 kHz and ceil (N1/14)=14 for 960 kHz). The scaling value may be ×4 and ×8 for the 480 and 960 kHz SCSs, respectively (in this case, the scaling value is not limited to 4 times (480 kHz) and 8 times (960 kHz)). If the offset is applied to four values among the 8 conventional values and if the scaling is applied to the other values (in this case, the number of values changed by the offset and the number of values changed by the scaling are also not limited to 4 and 4, that is, they may be set to 0/8, 1/7, 8/0), new values may be defined and used as follows.

1.1.1-(1) For 480 kHz, the offset is applied to all 8 values: {1, 2, 3, 4, 5, 6, 7, 8}→{8, 9, 10, 11, 12, 13, 14, 15}.

1.1.1-(2) For 480 kHz, the scaling is applied to all 8 values: {1, 2, 3, 4, 5, 6, 7, 8}→{4, 8, 12, 16, 20, 24, 28, 32}.

1.1.1-(3) For 960 kHz, the offset is applied to all 8 values: {1, 2, 3, 4, 5, 6, 7, 8}→{15, 16, 17, 18, 19, 20, 21, 22}.

1.1.1-(4) For 960 kHz, the scaling is applied to all 8 values: {1, 2, 3, 4, 5, 6, 7, 8}→{8, 16, 24, 32, 40, 48, 56, 64}.

1.1.1-(5) For 480 kHz, the offset is applied to four values and the scaling is applied to the other four values: {1, 2, 3, 4, 5, 6, 7, 8}→{8, 9, 10, 11, 20, 24, 28, 32}.

1.1.1-(6) For 960 kHz, the offset is applied to four values and the scaling is applied to the other four values: {1, 2, 3, 4, 5, 6, 7, 8}→{15, 16, 17, 18, 40, 48, 56, 64}.

1.1.1-(7) For 480 kHz, the maximum values between the values where the offset is applied and the values where the scaling is applied are used: {1, 2, 3, 4, 5, 6, 7, 8}→{8, 9, 12, 16, 20, 24, 28, 32}.

1.1.1-(8) For 960 kHz, the maximum values between the values where the offset is applied and the values where the scaling is applied are used: {1, 2, 3, 4, 5, 6, 7, 8}→{15, 16, 24, 32, 40, 48, 56, 64}.

In addition, when a PDSCH is scheduled by DCI format 1_0, {1, 2, 3, 4, 5, 6, 7, 8} of the conventional communication system are used as values defined by three bits of the K1 field (PDSCH-to-HARQ_feedback timing indicator field). However, the UE may interpret and/or use some of the indicated values by adding an offset dependent on the N1 value thereto and use the rest of the indicated values by applying scaling by the conventional value. In an embodiment, the BS may instruct the UE to use the conventional values of {1, 2, 3, 4, 5, 6, 7, 8}, and the UE may add the offset to some values and apply the scaling to other values when determining values to be actually applied based on the indicated values. In this case, ceil (N1/14) may be used as the offset (in this case, the N1 value may vary depending on the SCS and/or additional DMRS configuration) (in this example, it is assumed that N1=96 for 480 kHz and N1=192 for 960 kHz). The scaling value may be ×4 and ×8 for the 480 and 960 kHz SCSs, respectively (in this case, the scaling value is not limited to 4 times (480 kHz) and 8 times (960 kHz)). If the offset is applied to four values among the 8 conventional values and if the scaling is applied to the other values (in this case, the number of values changed by the offset and the number of values changed by the scaling are also not limited to 4 and 4, that is, they may be set to 0/8, 1/7, 8/0), the UE may interpret and/or apply the 8 values as new values as follows.

1.1.2-(1) For 480 kHz, the offset is applied to all 8 values: {1, 2, 3, 4, 5, 6, 7, 8} are indicated, and {8, 9, 10, 11, 12, 13, 14, 15} are applied.

1.1.2-(2) For 480 kHz, the scaling is applied to all 8 values: {1, 2, 3, 4, 5, 6, 7, 8} are indicated, and {4, 8, 12, 16, 20, 24, 28, 32} are applied.

1.1.2-(3) For 960 kHz, the offset is applied to all 8 values: {1, 2, 3, 4, 5, 6, 7, 8} are indicated, and {15, 16, 17, 18, 19, 20, 21, 22} are applied.

1.1.2-(4) For 960 kHz, the scaling is applied to all 8 values: {1, 2, 3, 4, 5, 6, 7, 8} are indicated, and {8, 16, 24, 32, 40, 48, 56, 64} are applied.

1.1.2-(5) For 480 kHz, the maximum values between the values where the offset is applied and the values where the scaling is applied are used: {1, 2, 3, 4, 5, 6, 7, 8} are indicated and {8, 9, 12, 16, 20, 24, 28, 32} are applied.

1.1.2-(6) For 960 kHz, the maximum values between the values where the offset is applied and the values where the scaling is applied are used: {1, 2, 3, 4, 5, 6, 7, 8} are indicated and {15, 16, 24, 32, 40, 48, 56, 64} applied.

Among the 8 K1 field values, the number of values to which the offset is applied and the number of values to which the scaling is applied are not limited to the above embodiment, which may be predetermined as a specific ratio. For example, the offset may be applied to the first four values among the 8 values, and the scaling may be applied to the last four values. As another example, the offset may be applied to the first two values, and scaling may be applied to the last four values. As another example, the offset may be applied to the 1st, 3rd, 5th, and 7th values among the 8 values, and the scaling may be applied to the 2nd, 4th, 6th, and 8th values. The number and positions of values to which the offset is to be applied and the number and positions of values to which the scaling is applied may be configured by higher layer signaling such as RRC or signaling such as DCI. In addition, the scaling value is not limited to the above embodiment, which may be predetermined as a specific value (for each SCS or regardless of the SCS). Alternatively, the scaling value may be configured by higher layer signaling such as RRC or signaling such as DCI. To determine the offset value, floor (N1/c) or ceil (N1/c) proposed above in Section 1.1 may be used.

In addition, the K1 field (PDSCH-to-HARQ_feedback timing indicator field) values of DCI format 1_0 may be newly determined according to the following methods. According to the following methods, when a high SCS (e.g., 480 or 960 kHz) is configured in a system operating in a frequency band of 52.6 GHz, the K1 field values of DCI format 1_0 may be determined as different values from the conventional ones, i.e., {1, 2, 3, 4, 5, 6, 7, 8} of the conventional system operating in the conventional 52 GHz frequency band. According to the following methods, when the conventional K1 field consisting of three bits, i.e., 8 values, is used for a high SCS (e.g., 480 or 960 kHz) larger than the 120 kHz SCS, the problem of lowering PDSCH scheduling flexibility may be solved. Two representative examples of potential problems are as follows. First, when the conventional values of {1, 2, 3, 4, 5, 6, 7, 8} are simply scaled 4 times or 8 times, the granularity of PDSCH scheduling may be changed from one slot to 4 or 8 slots. Second, when only a specific offset value is added to the conventional values, the scheduling granularity may be maintained as one slot, but there may be a problem in that PDSCH scheduling is allowed only in slots having a limited distance from a PUCCH at a specific location. According to the proposed methods, the worst scenario of these two problems may be avoided.

(Proposed method 1.1.k1-1) Method of maintaining K1 field of DCI format 1_0 (PDSCH-to-HARQ_feedback timing indicator field) as three bits (or extending K1 field larger than three bits) and then defining new values suitable for higher SCS (e.g., 480 or 960 kHz) than 120 kHz. Specifically, $2^Z$ values, which are representable by Z bits, may be configured according to the following rules. The $2^Z$ values representable by the Z bits are divided into M sub-groups. Each sub-group consists of L consecutive numbers (or numbers at specific intervals). In this case, M and L are integers greater than 0, and $M*L=2^Z$ is satisfied. In addition, all M*L values are different values, and duplicate numbers are not allowed (here, the sub-groups are divided into a first sub-group, a second sub-group, etc. in ascending order of numbers/values included in the sub-groups). For example, 8 values representable by three bits may be divided into M slot groups (M=1), each consisting of L consecutive numbers (L=8). The 8 values may be divided into M slot groups (M=2), each consisting of L consecutive numbers (L=4). Alternatively, the 8 values may be divided into M slot groups (M=8), each consisting of L consecutive numbers (L=1).

In the following rules, various K1 field values may be defined depending on an interval (=T) between sub-groups and/or an interval (=J) between values in the sub-group in addition to M and L described above. As the value of M or T increases, a larger range of values may be supported. However, as the difference between sub-groups increases, the scheduling granularity may decrease. The value of J may also control the scheduling range and granularity within the sub-group. For example, if J=1, the UE may support HARQ-ACKs for PDSCHs received in consecutive slots. However, compared to J>1, it may be difficult to indicate a larger range of slot offsets. This is because when limited Z bits (or $2^Z$ value sets) are used, it is difficult to simultaneously support a large scheduling range and a high scheduling granularity, which are in the trade-off relationship. Therefore, to secure appropriate scheduling flexibility for each SCS, it is necessary to define the most appropriate set of values for each SCS based on appropriate selection/combination of M, L, T, J, etc. in Rule 1.1.3-1 to Rule 1.1.3-3.

Rule 1.1.3-1: Method of determining smallest value (=S1) of first sub-group.

Floor (N1/c) or ceil (N1/c) proposed above in Section 1.1 may be used as the smallest value of the first sub-group. Alternatively, a value obtained by applying "+1" or "−1" to floor (N1/c) or ceil (N1/c) may be used. If multi-slot PDCCH monitoring is introduced with a high SCS (e.g., 480 or 960 kHz), the position of PDCCH monitoring slots (or slot-group) and the position of PDSCH reception slots may be distributed by the adjustment of +1 or −1. N1 may be predefined for each SCS, and c may be predefined as described above in Section 1.1. For example, 14, which is the number of symbols included in one slot, may be used as the value of c. Alternatively, the first value (that is, the smallest value) of the first sub-group may have a different value for each SCS. The first value may be determined as "$2^{(u\_SCS-3)}$" with u_SCS, which indicates the numerology of an SCS. Alternatively, the first value may be determined as "$2^{(u\_SCS-3)}+1$" or "$2^{(u\_SCS-3)}-1$". For u_SCS, the relation of "$2^{(u\_SCS)}*15$ [kHz]=SCS [kHz]" may be satisfied. For example, u_SCS=3 for 120 kHz SCS, u_SCS=5 for 480 kHz SCS, and u_SCS=6 for 960 kHz SCS. If a large PDSCH processing time is configured for a specific SCS, the first value may be determined as "$2^{(u\_SCS-2)}$". This is because if the PDSCH processing time required for the specific SCS is greater than "$2^{(u\_SCS-3)}$", this value may have a very low probability of being used. Similarly, the first value may also be determined as "$2^{(u\_SCS-2)}+1$" or "$2^{(u\_SCS-2)}-1$".

Rule 1.1.3-2: Method of determining smallest value of sub-groups other than first one.

This rule is applied when M>1. The smallest value of sub-groups other than the first sub-group is determined by adding a specific value (=T) or a multiple of the specific value T to the smallest value of the first sub-group determined according to Rule 1.1.3-1. The specific value T may be different for each SCS, which may be determined as a multiple power of 2 such as T=1, T=2, T=4, T=8, or T=16. For example, the smallest value of the second sub-group may be obtained by adding T to the smallest value of the first sub-group. The smallest value of the third sub-group may be obtained by adding 2*T to the smallest value of the first sub-group (that is, it corresponds a value obtained by adding T to the smallest value of the second sub-group). The smallest value of an n-th sub-group may be obtained by adding (n−1)*T to the smallest value of the first sub-group (that is, it corresponds to a value obtained by adding T to the smallest value of an (n−1)-th sub-group).

Rule 1.1.3-3: For each sub-group, L−1 values except for the smallest value may be determined as consecutive numbers/values increasing by a specific interval (=J) from a value determined according to Rule 1.1.3-1 and Rule 1.1.3-2. The specific interval J may be different for each SCS, and an integer greater than 0 may be used as J. For example, when Z=3, M=1, L=8, and J=1, if N1=80 for the 480 kHz SCS and if the smallest value of a sub-group is ceil (N1/14)+1=7, the K1 field values may be determined as {7, 8, 9, 10, 11, 12, 13, 14}. If N1=160 for the 960 kHz SCS and the smallest value of a sub-group is ceil (N1/14)+1=13, the K1 field values may be determined as {13, 14, 15, 16, 17, 18, 19, 20}. As another example, when Z=3, M=4, L=2, T=4 (for 480 kHz) or T=8 (for 960 kHz), J=1, if the smallest value of the first sub-group is the same as above, the K1 field values may be determined as {7, 8, 11, 12, 15, 16, 19, 20} and {13, 14, 21, 22, 29, 30, 37, 38} for the 480 and 960 kHz SCSs, respectively. In this example, if J=2, the K1 field values may be determined as {7, 9, 11, 13, 15, 17, 19, 21} and {13, 15, 21, 23, 29, 31, 37, 39} for the 480 and 960 kHz SCSs, respectively.

The proposed methods and/or rules are not limited to the case of Z=3 bits. Even when the bitwidth of the K1 field of DCI format 1_0 is increased by Z=4 or Z=5 bits, the proposed methods and/or rules may be equally applied to determine specific values.

The proposed methods and/or rules may be used to define specific values of the K1 field of DCI format 1_0 (i.e., values determined by the proposed methods and/or rules are hard-coded in the specification). Alternatively, the values of the K1 field of DCI format 1_0 are maintained as the conventional values of {1, 2, . . . , 8}. Even if the BS (NodeB) indicates the conventional values, the UE may derive and apply (consider, assume, or configure) actual values different from the conventional values according to the methods/rules described above based on the indicated values.

Embodiments 1.1.4-1 to 1.1.4-10 below may be understood as representative examples of the K1 field values created according to the above-described rules (in this case, value sets that may be created according to the above rules are not limited thereto). One of these value sets may be used as the K1 field (PDSCH-to-HARQ_feedback timing indicator field) values of DCI format 1_0 for the 480/960 kHz SCS.

Embodiment 1.1.4-1: When Z=3, S1=7, M=1, L=8, and J=1 for 480 kHz, the values are determined as follows. ACK/NACK feedback may be continuously provided for PDSCHs.
{7, 8, 9, 10, 11, 12, 13, 14}

Embodiment 1.1.4-2: When Z=3, S1=7, M=8, L=1, and T=4 for 480 kHz, the values are determined as follows. Embodiment 1.1.4-2 may support a larger range of values, compared to Embodiment 1.1.4-1.
{7, 11, 15, 19, 23, 27, 31, 35}

Embodiment 1.1.4-3: When Z=3, S1-7, M-4, L-2, T-4, and J-1 for 480 kHz, the values are determined as follows. Embodiment 1.1.4-3 may support a larger range of values compared to Embodiment 1.1.4-1 while supporting consecutive values compared to Embodiment 1.1.4-2.
{7, 8, 11, 12, 15, 16, 19, 20}

Embodiment 1.1.4-4: When Z=3, S1=8, M=8, L=1, and T=4 for 480 kHz, the values are determined as follows. These values are characterized in that a PDSCH reception slot for the 480 kHz SCS is aligned with the slot boundary of the 120 kHz SCS, compared to embodiment 1.1.4-2.
{8, 12, 16, 20, 24, 28, 32, 36}

Embodiment 1.1.4-5: When Z=3, S1=13, M=1, L=8, and J=1 for 960 kHz, the values are determined as follows. ACK/NACK feedback may be continuously provided for PDSCHs.
{13, 14, 15, 16, 17, 18, 19, 20}

Embodiment 1.1.4-6: When Z=3, S1=13, M=8, L=1, and T=4 for 960 kHz, the values may be determined as {13, 17, 21, 25, 29, 33, 37, 41}. When Z=3, S1=13, M=8, L=1, and T=8, the values may be determined as {13, 21, 29, 37, 45, 53, 61, 69}. Compared to Embodiment 1.1.4-5, the UE may be indicated with larger values.

Embodiment 1.1.4-7: When Z=3, S1=13, M=4, L=2, T=8, and J=1 for 960 kHz, the values may be determined as {13, 14, 21, 22, 29, 30, 37, 38}. When Z=3, S1=13, M=2, L=4, T=8, and J=1, the values may be determined as {13, 14, 15, 16, 21, 22, 23, 24}. Thus, Embodiment 1.1.4-7 may increase scheduling flexibility compared to Embodiment 1.1.4-6 while supporting a large range compared to Embodiment 1.1.4-5.

Embodiment 1.1.4-8: When Z=3, S1=16, M=8, L=1, and T=8 for 960 kHz, the values are determined as follows. Compared to Embodiment 1.1.4-5, a PDSCH reception slot for 960 kHz may be aligned with the slot boundary of the 120 kHz SCS.
{16, 24, 32, 40, 48, 56, 64, 72}

Embodiment 1.1.4-9: When Z=4, S1-7, M-1, L-16, J-1 (if the field in DCI becomes four bits), the values may be determined as follows.
{7, 8, 9, 10, 11, 12, 13, 14, 15, 16, 17, 18, 19, 20, 21, 22}

Embodiment 1.1.4-10: When Z=5, S1=1, M=1, L=32, and J=1 (if the field in DCI is 5 bits), the values may be determined as follows.
{1, 2, 3, 4, 5, 6, 7, 8, 9, 10, 11, 12, 13, 14, 15, 16, 17, 18, . . . , 31, 32}

The proposed exact/specific values of the K1 field of DCI format 1_0 are not limited to the above embodiments. That is, the exact numbers/values may also be determined according to Rule 1.1.3-1, Rule 1.1.3-2, or Rule 1.1.3-3 described above.

(Proposed method 1.1.k1-2) This is another method of determining a UL slot for a HARQ-ACK based on K1 field (PDSCH-to-HARQ_feedback timing indicator field) values indicated by DCI when a PDSCH is scheduled by DCI format 1_0. The UE may subtract a specific value from the indicated K1 field values according to the index of the slot in which the PDSCH is received. After performing the modulation operation of the slot index and a specific number (divisor), the slot offset between the received PDSCH and the UL slot for transmitting the corresponding HARQ-ACK may be determined according to the result (reminder). The slot offset between the PDSCH and the UL slot to be actually applied by the UE may be determined according to [Equation 1.1.k1-2].

$$k1\_applied = k1\_indicated - \text{modulo}(slot\_index, B) \quad \text{[Equation 1.1.k1-2]}$$

In [Equation 1.1.k1-2], k1_applied denotes the "slot offset between the PDSCH and the UL slot for HARQ-ACK transmission" to be actually applied by the UE, k1_indicated denotes the "PDSCH-to-HARQ_feedback timing indicator field indicated to the UE", and slot_index denotes the "slot index of the slot in which the UE has received the PDSCH".

The modulo operation of (x, y) denotes the remainder when x is divided by y. The constant B may have a different value according to the SCS, which may be predefined or separately indicated by RRC or DCI. For example, B=4 may be predefined for the 480 kHz SCS, and B=8 may be predefined for the 960 kHz SCS. In an embodiment, when k1_indicated={8, 16, 24, 32, 40, 48, 56, 64} is defined for the 960 kHz SCS, the UE needs to receive the corresponding PDSCH in one of slot #(n−8), slot #(n−16), . . . , slot #(n−64) to transmit a HARQ-ACK in slot #n. In other words, the PDSCH reception slot scheduled for the HARQ-ACK transmission in the corresponding UL slot needs to exist only at an interval of 8 slots. If the UE receives the PDSCH in slots therebetween (i.e., slot #(n−9), slot #(n−10), . . . , slot #(n−15)), the UE may not transmit the HARQ-ACK in slot #n. In some cases, the UE may not be indicated with a valid UL slot for transmitting the HARQ-ACK. However, when [Equation 1.1.k1-2] is applied, even if the UE receives a PDSCH in any one of the following 8 slots: slot #(n−16) to slot #(n−9), the UE may be instructed to transmit a HARQ-ACK in slot #n.

In addition, enabling/disabling of the above operation may be configured and/or indicated by a separate RRC configuration or a DCI field. For example, if [Equation 1.1.k1-2] is enabled by a separate parameter/field of RRC or DCI, the UE may be instructed to transmit a HARQ-ACK for a PDSCH, which is received in slot #(n−15), in slot #n based on "indicated k1=16". If [Equation 1.1.k1-2] is disabled by a separate parameter/field of RRC or DCI, the UE may be instructed to transmit a HARQ-ACK for a PDSCH, which is received in slot #(n−15), in slot #(n+1). In addition, enabling/disabling of the above operation may be implicitly determined according to a frame index (or SFN), a subframe index, a slot index, and the like. For example, when modulo (SFN, 2)=0, the operation may be enabled. When modulo (SFN, 2)=1, the operation may be disabled. The operation may be enabled for every even numbered frame. Accordingly, the UE may expect increased scheduling flexibility even for a high SCS (e.g., 480 or 960 kHz) based on only a K1 field with a limited number of bits (bitwidth).

1.2. Method of Changing Range of K0 Values Based on $N_{pdsch}$, $\mu_{PDCCH}$, and $\mu_{PDSCH}$ (for Cross-Carrier Scheduling)

K0 denotes a slot offset from a slot for receiving a DL grant PDCCH to a slot for receiving a PDSCH. When the UE is configured with K0, the UE may determine a slot $K_s$ for receiving the PDSCH according to Table 10 defined in 3GPP TS 38.214.

TABLE 10

The slot allocated for the PDSCH is $K_S$, where $$K_S = \left\lfloor n \cdot \frac{2^{\mu_{PDSCH}}}{2^{\mu_{PDCCH}}} \right\rfloor + K_0 + \left\lfloor \left( \frac{N_{slot, offset, PDCCH}^{CA}}{2^{\mu_{offset, PDCCH}}} - \frac{N_{slot, offset, PDSCH}^{CA}}{2^{\mu_{offset, PDSCH}}} \right) \cdot 2^{\mu_{PDSCH}} \right\rfloor,$$

if UE is configured with ca-SlotOffset for at least one of the scheduled and scheduling cell, and $$K_S = \left\lfloor n \cdot \frac{2^{\mu_{PDSCH}}}{2^{\mu_{PDCCH}}} \right\rfloor + K_0,$$

otherwise, and where n is the slot with the scheduling DCI, and K0 is based on the numerology of PDSCH, and $\mu_{PDCCH}$ and $\mu_{PDSCH}$ are the subcarrier spacing configurations for PDSCH and PDCCH, respectively, In this case, when $\mu_{PDCCH}$ and $\mu_{PDSCH}$ have different values, K0 is interpreted in units of slots based on $\mu_{PDSCH}$.

When $\mu_{PDSCH} > \mu_{PDCCH}$, K0=0 means the earliest slot among PDSCH slots related to a slot in which the PDCCH is received. When $\mu_{PDSCH} < \mu_{PDCCH}$, K=0 means a PDSCH slot related to the slot in which the PDCCH is received.

In cross-carrier scheduling, when the values of $\mu_{PDCCH}$ and $\mu_{PDSCH}$ are different, only if it is guaranteed that the position of $K_s$ is away more than $N_{pdsch}$ symbols (in units of PDCCH symbols) from the last PDCCH reception symbol, the UE may expect normal PDSCH reception even though $K_s$ is determined according to the above equation. Referring to 3GPP TS 38.214, $N_{pdsch}$ is defined as shown in Table 11.

Table 11 is equivalent to Table 5.5-1: $N_{pdsch}$ as a function of the subcarrier spacing of the scheduling PDCCH of 3GPP TS 38.214.

TABLE 11

| $\mu_{PDCCH}$ | $N_{pdsch}$ [symbols] |
| --- | --- |
| 0 | 4 |
| 1 | 5 |
| 2 | 10 |
| 3 | 14 |

It may be seen from Table 11 that $N_{pdsch}$ corresponding to $\mu_{PDCCH}$=5 and $\mu_{PDCCH}$=6 for the 480 and 960 kHz SCSs, which are newly introduced for the 52.6 GHz band, may be set to a value greater than 14.

For mixed SCSs in cross-carrier scheduling as described above, when the slot $K_s$ is determined by K0, if the interval from the last PDCCH symbol is not guaranteed by the number of $N_{pdsch}$ symbols, a specific value of K0 may be unnecessary because the UE does not expect to receive the PDSCH. More specifically, when $N_{pdsch} > N_{pdcch}$, the number of unnecessary K0s (where no PDSCH reception is expected) may vary according to the index of the last symbol in which the PDCCH is received even within a slot in which the PDCCH is received.

For example, considering a case where $\mu_{PDCCH}$=3 (i.e., 120 kHz SCS) and $\mu_{PDSCH}$=6 (i.e., 960 kHz SCS), if the PDCCH is received in 120 k (kHz) slot 0 of FIG. 6, the position corresponding to K0=0 becomes 960 k (kHz) slot 0 (In FIG. 6, a number in a slot means a slot index).

If the PDCCH is received in symbol 0 of slot 0, the UE may expect to receive the PDSCH from 960 k slot 8 (or 7) due to constraints by $N_{pdsch}$. In this case, if $K_s$ is determined by a K0 value smaller than 8 (or 7), the UE does not expect PDSCH reception in the corresponding slot. On the other hand, if the PDCCH is received in symbol 13 of slot 0, the UE may expect to receive the PDSCH from 960 k slot 15 (or 14) due to the constraints by $N_{pdsch}$. Thus, the UE does not expect to receive the PDSCH in the slot $K_s$ determined based on a K0 value smaller than 15 (or 14).

To exclude values in which no PDSCH reception is expected from among the values of K0, new K0 values may be determined according to the following equation (in the following equation, the K0 value configurable in the conventional communication system is expressed as K0').

$$1.2 - (1) K0 = \left\lceil \frac{N_{pdsch}}{c} \right\rceil + K0' \text{ or}$$

$$K0 = \left\lceil \frac{N_{pdsch}}{c} \right\rceil + K0' \text{ or}$$

$$1.2 - (2) K0 = \left\lceil \frac{N_{pdsch}}{c} \cdot \frac{2^{\mu_{pdsch}}}{2^{\mu_{pdcch}}} \right\rceil + K0' \text{ or}$$

-continued $$K0 = \left\lceil \frac{N_{pdsch}}{c} \cdot \frac{2^{\mu_{pdsch}}}{2^{\mu_{pdcch}}} \right\rceil + K0'.$$

In Equations 1.2-(1) and 1.2-(2), c may be semi-statically configured by RRC, a MAC CE, etc. or dynamically configured by DCI. As the default value of c, $$14 \cdot \frac{2^{\mu_{pdsch}}}{2^{\mu_{pdcch}}}$$

may be used in Equation 1.2-(1), and 14, which is the number of symbols per slot, may be used in Equation 1.2-(2).

In addition, new K0 values may be determined according to the following equation to correct the impact on the last symbol in which the PDCCH is received together.

$$1.2-(3) K0 = K0' + \left\lceil \frac{N_{pdsch}}{c} \cdot \frac{2^{\mu_{pdsch}}}{2^{\mu_{pdcch}}} \right\rceil + O_{sym}$$

$$1.2-(4) K0 = K0' + \left\lfloor \frac{N_{pdsch}}{c} \cdot \frac{2^{\mu_{pdsch}}}{2^{\mu_{pdcch}}} \right\rfloor + O_{sym}$$

In this case, $O_{sym}$ may be determined by one of Equations 1.2-(5), 1.2-(6), and 1.2-(7), and $O_{sym,0}$ $O_{sym,1}$, or $O_{sym,2}$ may be used as in Equation 1.2-(3) or 1.2-(4).

$$1.2-(5) O_{sym,0} = \left\lfloor \frac{i_{sym}}{14} \cdot \frac{2^{\mu_{pdsch}}}{2^{\mu_{pdcch}}} \right\rfloor \text{ or}$$

$$1.2-(6) O_{sym,1} = \left\lceil \frac{i_{sym}}{14} \cdot \frac{2^{\mu_{pdsch}}}{2^{\mu_{pdcch}}} \right\rceil \text{ or}$$

$$1.2-(7) O_{sym,2} = \text{round}\left( \frac{i_{sym}}{14} \cdot \frac{2^{\mu_{pdsch}}}{2^{\mu_{pdcch}}} \right)$$

Figure 7:
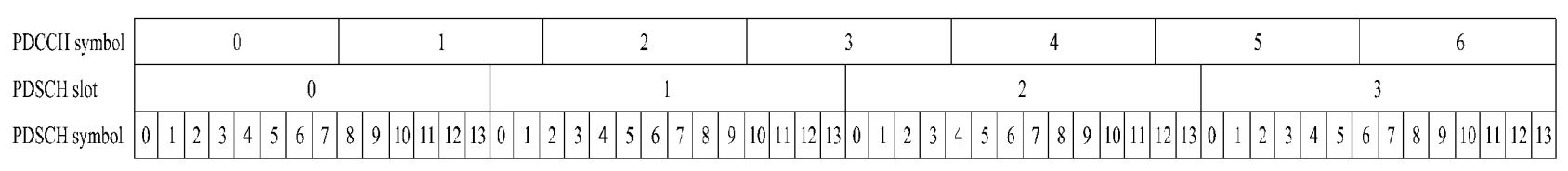

In this case, $i_{sym}$ means the index of the last symbol in which the PDCCH is received, and round ( ) means a round function. The reason for determining $O_{sym}$ with three methods is as follows. If PDCCH reception symbols spans two or more PDSCH slots, it may be ambiguous which index is selected from among the front PDSCH slot and the rear PDSCH slot. For example, FIG. 7 shows symbols and slots for a 120 kHz PDCCH and a 960 kHz PDSCH. When the PDCCH is received in PDCCH symbol index 3, PDSCH symbol index 1 or 2 is possible as $O_{sym}$ according to Equations 1.2-(3) and 1.2-(4).

Depending on multiple SCS configurations and multiple DL/UL slot configurations, it may be useful to select the index of the front slot or the index of the rear slot optionally.

When the BS or UE calculates K0 again according to Equation 1.2-(3) or 1.2-(4), the BS and/or UE may determine all of $O_{sym,0}$, $O_{sym,1}$, and $O_{sym,2}$ as $O_{sym}$ and then select and apply one value. In this case, selecting the value to be used may be semi-statically or dynamically configured by RRC or DCI, and one of $O_{sym,0}$, $O_{sym,1}$, and $O_{sym,2}$ may be used as a default value.

The methods described above in 1.2-(1) and 1.2-(2) may be configured to operate only for a specific SCS (e.g., 960 kHz). In addition, Methods 1.2-(1) and 1.2-(2) may operate only when $\mu_{pdcch}$ has a specific value or only when $\mu_{pdsch}/\mu_{pdcch}$ (the value obtained by dividing $\mu_{pdsch}$ by $\mu_{pdcch}$) is greater than a specific value. Alternatively, Methods 1.2-(1) and 1.2-(2) may operate only when $\mu_{pdsch}/\mu_{pdcch}$ is smaller than the specific value. For example, Methods 1.2-(1) and 1.2-(2) may be configured to operate only when the PDCCH is configured for the 120 kHz SCS and the PDSCH is configured for the 960 kHz SCS. In addition, Methods 1.2-(1) and 1.2-(2) are configured with different c values, and then the configuration of K0 may be switched by 1.2-(1) and 1.2-(2). In this case, a switch flag may be indicated by DCI.

1.3. Method of Determining Range of K1 Values According to Range of K0 Values or Determining Range of K0 Values According to Range of K1 Values While a PDSCH is scheduled by a DL grant and a HARQ-ACK for the corresponding PDSCH is transmitted over a PUCCH and/or a PUSCH, the BS may configure/indicate to the UE K0 (that is, the interval between a slot for receiving the PDCCH and a slot for receiving the scheduled PDSCH) and K1 (that is, the interval between a slot for receiving the PDSCH and a slot for transmitting the HARQ-ACK therefor). In the conventional communication system (i.e., NR Rel-15), the values of K0 are supported from 0 to 32, and the values of K1 are supported from 0 to 15.

Figure 8:
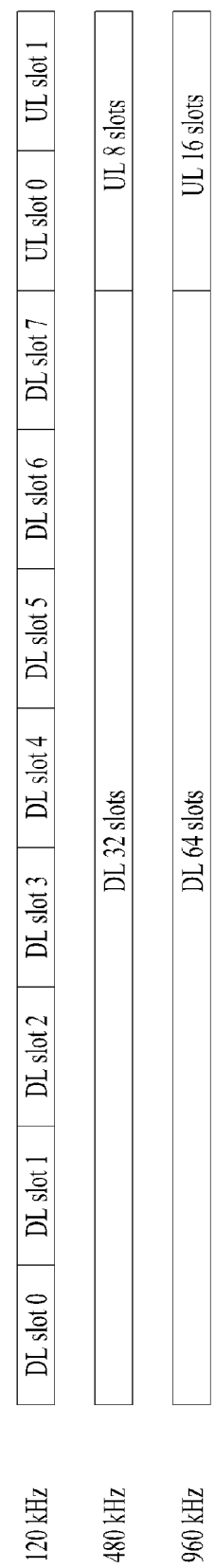

It may be assumed that a slot in which the UE transmits a PUCCH and/or a PUSCH including a HARQ-ACK is semi-statically configured. For example, FIG. 8 illustrates an exemplary TDD configuration. Specifically, FIG. 8 shows an example in which the ratio of DL slots or special slots to UL slots is set to 8:2. The TDD configuration for a cell with the 480 kHz SCS and the TDD configuration for a cell with the 960 kHz SCS may be configured such that each TDD configuration is aligned with DL/special and UL slots in the TDD configuration of a cell configured with the 480 kHz SCS.

For convenience of description, the indices of 64 DL slots of the cell configured with the 960 kHz SCS are expressed as 0, 1, . . . , 63 from the left. If a PDCCH scheduling a PDSCH is received in slot 0 in a situation where the SCSs of the PDCCH/PDSCH are all 960 kHz, the first symbol of the PDSCH may be located between slot 0 and slot 32. In addition, considering the range (0 to 15) of the offset K1 from the PDSCH reception slot (or the last slot for a multi-slot PDSCH) to a UL slot, the PDSCH reception slot (or the last slot for the multi-slot PDSCH) may be located between slot index 48 and slot index 63. Therefore, in order to perform PDSCH scheduling in the above situation based on the current values of K0 and K1, an interval between the first slot and the last slot among multiple slots in which PDSCHs are located may need to be 16 or higher. To configure multi-slot PDSCH scheduling with a short length, it is necessary to increase the range of values of K0 and/or K1. In this satiation, it is not necessary for K0 and K1 to be set to large values at the same time. When the PDCCH is received in a situation where the positions of UL slots are determined, if K0 is set to a large value, K1 may be set to a relatively small value. When K0 is set to a small value, K1 may be set to a relatively large value to set K1 suitable for the positions of the UL slots.

In general, if the positions of the UL slots are determined semi-statically, the range of values of K0 and/or K1 need to be increased depending on the position of a slot for receiving a DL grant PDCCH. In addition, a method of determining the combination of the values of K0 and K1 within an appropriate range may also be considered. The use of K0 and/or K1 values within the appropriate range may also be helpful in terms of flexibility of multi-slot PDSCH scheduling. In Section 1.3, a method of determining the range of K1 values according to the range of K0 values and a method of determining the range of K0 values according to the range of K1 values are proposed.

1.3.1. Different Interpretation of Ranges of K1 Values Depending on Range of K0 Values The BS indicates to the UE K0 and K1 configurable for PDSCH and HARQ-ACK scheduling. The UE divides the indicated K0 value range into N parts and determines an offset to be added to the K1 values according to the range of each value as shown in Table 12.

TABLE 12

For N = 3,
If a <= K0 < b, the offset is determined as F_a.
If b <= K0 < c, the offset is determined by F_b.
If c <= K0 < d, the offset is determined by F_c.
In this case, the relation of 0 <= a < b < c < d is established, and the relation of F_a > F_b > F_c >= 0 is established. The values of N, a, b, c, d, F_a, F_b, and F_c may be semi-statically configured by higher layer signaling such as RRC or dynamically configured by DCI.

When the offset to be added to K1 is determined, the UE adds the offset to the indicated K1 values to determine the slot offset from the last PDSCH reception slot to a UL slot in which the corresponding HARQ-ACK is transmitted (that is, the UE determines the position of the slot for transmitting the HARQ-ACK).

In an embodiment, K0={0,1, . . . ,32} is divided into N=3 parts. It is determined that a=0, b=10, c=20, d=30, F_a=8, F_b=4, and F_c=2. When K0=9 is indicated by the BS, the UE determines K1+8 (=K1+F_a) as the slot interval from the last PDSCH reception slot to the UL slot in which the corresponding HARQ-ACK is transmitted and determines the position of the UL slot in which the HARQ-ACK is to be transmitted.

1.3.2. Different Interpretation of Ranges of K1 Values Depending on Range of K0 Values.

The BS indicates to the UE K0 and K1 configurable for PDSCH and HARQ-ACK scheduling. The UE divides the indicated K1 value range into M parts and determines an offset to be added to the K0 values according to the range of each value as shown in Table 13.

TABLE 13

For M = 2,
If e <= K1 < f, the offset is determined by F_e.
If f <= K1 < g, the offset is determined by F_f.
In this case, the relation of 0 <= e < f < g is established, and the relation of F_e > F_f >= 0 is established. The values of M, e, f, g, F_e, F_f may be configured semi-statically by higher layer signaling such as RRC or dynamically configured by DCI.

When the offset to be added to K0 is determined, the UE adds the offset to the indicated K0 values to determine the slot offset from a PDCCH reception slot to PDSCH reception (that is, the UE determines the position of the PDSCH reception slot).

In an embodiment, K1={0,1, . . . ,15} is divided into M=2 parts. It is determined that e=0, f=8, g=15, F_e=8, and F_f=4. When K1=9 is indicated by the BS, the UE may determine the position of the PDSCH reception slot by determining K0+4 (=K0+F_f) as the slot interval from the PDCCH reception slot to the PDSCH reception.

According to the method described above, configurable K0 values are divided into N groups in the order of size, a different offset is preconfigured for each group, and values obtained by adding the corresponding offset to the configurable K1 values may be indicated to the UE as new K1 values. In addition, configurable K1 values are divided into M groups in the order of size, a different offset is preconfigured for each group, and values obtained by adding the corresponding offset to the configurable K0 values may be indicated to the UE as new K0 values.

1.4. Method of Changing Range of K2 Values Suitable for Range of N2 Values

According to methods defined in 3GPP TS 38.214, when the UE is configured to transmit a TB with or without a CSI report over a PUSCH, the UE may obtain the value of K2 from a time domain resource assignment (TDRA) field of corresponding DCI and related tables. In addition, when it is indicated by the DCI that the UE needs to transmit a CSI report over a PUSCH with no TB, $$K_2 = \max_j Y_j(m+1)$$

is determined by a TDRA field value m of DCI and $Y_j$, which is given by reportSlotOffsetListDCI-0-2, reportSlotOffsetListDCI-0-1, or reportSlotOffsetList in an RRC parameter CSI-ReportConfig. On the other hand, the UE may report to the BS the time required to transmit a PUSCH after receiving UL grant DCI, and in this case, N2 is represented in units of symbols. After receiving the N2 value, the BS determines the K2 value to be more than or equal to the corresponding absolute time and configures and/or indicates the K2 value to the UE. In a specific case, there may be invalid values among K2 values that may be supported according to the range of N2 values. For example, when N2>14, if the UE is configured with K2=0 or 1, the UE may not need to transmit the PUSCH. Alternatively, when a high SCS (e.g., 480 or 960 kHz) is used and the processing time of DCI scheduling multiple PUSCHs increases, K2 may need to have larger values larger than the supported ones. In this case, K2 may be determined according to the following methods.

1.4-(1) K2=ceil (N1/c)+'K2 value supported by RRC parameters'

1.4-(2) K2=floor (N1/c)+'K2 value supported by RRC parameters'

In Equations 1.4-(1) and 1.4-(2), c may be semi-statically configured by RRC, a MAC CE, etc., or dynamically configured by DCI. As the default value of c, 14, which is the number of symbols per slot, may be used. Methods 1.4-(1) and 1.4-(2) may be configured to operate only for a specific SCS (e.g., 480 or 960 kHz). Methods 1.4-(1) and 1.4-(2) may be configured to operate only when $N_2$ is greater than a specific value. In addition, Methods 1.4-(1) and 1.4-(2) are configured with different c values, and then the configuration of K2 may be switched by Methods 1.4-(1) and 1.4-(2). In this case, a switch flag may be indicated by DCI.

1.5. Method of Determining Aperiodic CSI-RS Triggering Offset

When an aperiodic CSI-RS (hereinafter referred to as an A-CSI-RS) is configured/indicated/used for A-CSI-RS reporting and when the numerology $\mu_{csirs}$ of the A-CSI-RS is different from the numerology $\mu_{pdcch}$ of a PDCCH triggering the A-CSI-RS, a CSI-RS triggering offset X (hereinafter, offset X) is configured for each resource set based on an RRC parameter aperiodicTriggeringOffset or aperiodicTriggeringOffset-r16. In this case, the offset X is a slot offset between a slot in which DCI (or a PDCCH) triggering an aperiodic non-zero power (NZP) CSI-RS resource is transmitted/received and a slot in which the corresponding CSI-RS is transmitted and/or received. The supportable values of the offset X are determined as follows according to the relationship between $\mu_{csirs}$ and $\mu_{pdcch}$.

$\mu_{pdcch} \leq \mu_{csirs}$: offset $X=\{0,1,\ldots,31\}$ $\mu_{pdcch} > \mu_{csirs}$: offset $X=\{0,1,2,3,4,5,6,\ldots,15,16,24\}$ Based on the offset X, the position of a slot $K_s$ in which the A-CSI-RS is transmitted is determined according to Table 14 below.

TABLE 14

The aperiodic CSI-RS is transmitted in a slot $$\left\lfloor n \cdot \frac{2^{\mu_{CSIRS}}}{2^{\mu_{PDCCH}}} \right\rfloor + X + \left\lfloor \left( \frac{N^{CA}_{slot,offset,PDCCH}}{2^{\mu_{offset,PDCCH}}} - \frac{N^{CA}_{slot,offset,CSIRS}}{2^{\mu_{offset,CSIRS}}} \right) \cdot 2^{\mu_{CSIRS}} \right\rfloor,$$

if UE is configured with ca-SlotOffset for at least one of the triggered and triggering cell, and $K_S = \left\lfloor n \cdot \frac{2^{\mu_{CSIRS}}}{2^{\mu_{PDCCH}}} \right\rfloor$, otherwise, and where n is the slot containing the triggering DCI, X is CSI-RS triggering offset in the numerology of CSI-RS according to the higher layer parameter aperiodicTriggeringOffset or aperiodicTriggeringOffset-r16,
$\mu_{CSI-RS}$ amd $\mu_{PDCCH}$ are the subcarrier spacing configurations for CSI-RS and PDCCH, respectively,
$N^{CA}_{slot,offset,PDCCH}$ and $\mu_{offset,PDCCH}$ are the $\mu_{slot,offset}^{CA}$ and the $\mu_{offset}$, respectively, which are determined by higher-layer configured ca-SlotOffset for the cell receiving the PDCCH respectively, $N^{CA}_{slot,offset,CSIRS}$ and $\mu_{offset,CSIRS}$ are the $N^{CA}_{slot,offset}$ and the $\mu_{offset}$, respectively, which are determined by higher-layer configured ca-SlotOffset for the cell transmitting the CSI-RS respectively, as defined in [4, TS 38.211] clause 4.5

The values of the offset X listed above are configured without considering a short slot duration for 480 or 960 kHz. When 480/960 kHz is used, it is necessary to increase the supported value range of the offset X. For example, when the offset X is 16, the number of slots at 960 kHz corresponding to the same time (absolute time) as 16 slots at 120 kHz becomes 128, and to support this, the value range of the offset X may increase.

(1.5-1) Configurable values of offset X may increase. That is, new configurable values for the RRC parameter aperiodicTriggeringOffset or aperiodicTriggeringOffset-r16 may be newly defined for each SCS (e.g., 480 and/or 960 kHz). In an embodiment, the conventional offset X may be determined as maximum values M times larger. For example, when M=8, the offset X may be set to $\{0, 1, \ldots, 31*8\}$. Alternatively, the offset X may be set to $\{0, 1*8, 2*8, \ldots, 31*8\}$. M may be predefined or determined semi-statically. For example, M may be determined to be 4 for 480 kHz or 8 for 960 kHz to align the timeline of a cell configured with 480 kHz or 960 kHz with the timeline of a cell configured with 120 kHz, but the present disclosure is not limited thereto.

(1.5-2) New offset may be configured by adding additional offset Y to offset X. Assuming that the conventional value of X is X', it may be determined that X=X'+Y. In an embodiment, the Y value may be determined according to one of the following methods, but the present disclosure is not limited thereto.

$-Y = \left\lfloor \frac{N_{csirs}}{c} \right\rfloor$ or $\left\lceil \frac{N_{csirs}}{c} \right\rceil$ $-Y = \left\lfloor \frac{N_{csirs}}{c} \cdot \frac{2^{\mu_{csirs}}}{2^{\mu_{pdcch}}} \right\rfloor$ or $\left\lceil \frac{N_{csirs}}{c} \cdot \frac{2^{\mu_{csirs}}}{2^{\mu_{pdcch}}} \right\rceil$ Alternatively, the following methods may also be considered based on the index ($i_{sym}$) of a symbol in which a PDCCH triggering an A-CSI-RS is received.

$-Y = \left\lfloor \frac{N_{csirs}}{c} \cdot \frac{2^{\mu_{csirs}}}{2^{\mu_{pdcch}}} \right\rfloor + W$ or -continued $\left\lceil \frac{N_{csirs}}{c} \cdot \frac{2^{\mu_{csirs}}}{2^{\mu_{pdcch}}} \right\rceil + W$ In this case, W is a value dependent on $i_{sym}$, which may be determined as follows.

$-W = \left\lfloor \frac{i_{sym}}{14} \cdot \frac{2^{\mu_{csirs}}}{2^{\mu_{pdcch}}} \right\rfloor$ or $\left\lceil \frac{i_{sym}}{14} \cdot \frac{2^{\mu_{csirs}}}{2^{\mu_{pdcch}}} \right\rceil$ round $\left( \frac{i_{sym}}{14} \cdot \frac{2^{\mu_{csirs}}}{2^{\mu_{pdcch}}} \right)$ The value of c may be semi-statically configured by RRC, a MAC CE, etc. or dynamically configured by DCI. As the default value of c, for example, 14, which is the number of symbols per slot, may be used.

A method of determining Y and W may be separately defined and applied for each SCS. Alternatively, the method of determining Y and W may be defined for each SCS, and then the maximum value may be commonly used for all SCSs. For example, Y and/or W of all cells may be determined based on an SCS where Y or W is the maximum value.

When the value range of the offset X is determined according to Methods 1.5-1 and 1.5-2 described above, the BS may configure and/or indicate the value range of the offset X to the UE through higher layer signaling such as RRC. Alternatively, if the BS configures and/or indicates the values of the offset X through RRC, etc. through mutual agreement between the BS and the UE without changing the value of the conventional offset X, the UE may operate by interpreting the values of the offset X as values defined (or increased) by Methods 1.5-1 and 1.5-2.

1.6 Method of determining offset of K2 based on $N_{esirs}$, Z, and Z'

According to the CSI computation time described in 3GPP TS 38.214, the timeline between DCI triggering transmission of a CSI report over a PUSCH, a CSI-RS or CSI-IM signal related thereto, and the corresponding PUSCH has the following relationship as shown in Table 15.

[Table 15]

For the above operation, when DCI triggering a CSI report on a PUSCH configure/indicates a slot for transmitting the corresponding PUSCH (for example, when the slot offset K2 between a PDCCH and UL transmission scheduled by the PDCCH is configured/indicated), the supportable value range of K2 needs to be adjusted again. For example, the values of $\{0, \ldots, 31\}$ may be indicated for K2 by RRC, etc. If Z and/or Z' (or $Z_{ref}$ and/or $Z'_{ref}(n)$) has a large value, small values of K2 (e.g., K2=0) are not necessary. In this case, the CSI report on the PUSCH indicated by the DCI may not be performed. Alternatively, the maximum value of K2 may need to be greater than 31, which is the conventional one. If Z and/or Z' are defined to have a very large value for 480 and 960 kHz, K2 may need to be out of the conventional value range. To this end, Section 1.6 proposes a method of determining a new value range of K2 based on Z, Z' and/or X (offset X in Section 1.5). According to the following method, the BS and UE may newly determine the value range of K2 and transmit/configure/indicate the value range of K2 through RRC, etc. Alternatively, the BS may transmit the conventional K2 values to the UE, and the UE may interpret and apply a slot offset between DCI (or PDCCH) and a UL slot in different ways according to the method described below.

Assuming that the conventional K2 value is K2_old, the slot offset added to the conventional K2 value is K2_offset, and the K2 value determined based on the additional offset is K2_new, the value range of K2 may be newly determined as follows: K2_new=K2_old+K2_offset. In this case, K2_offset may be determined according to one of the following methods.

TABLE 15

When the CSI request field on a DCI triggers a CSI report(s) on PUSCH, the UE shall provide a valid CSI report for the n-th triggered report,
- if the first uplink symbol to carry the corresponding CSI report(s) including the effect of the timing advance, starts no earlier than at symbol $Z_{ref}$, and
- if the first uplink symbol to carry the n-th CSI report including the effect of the timing advance, starts no earlier than at symbol $Z'_{ref}(n)$, where $Z_{ref}$ is defined as the next uplink symbol with its CP starting $T_{proc, CSI} = (Z)(2048 + 144) \cdot k2^{-\mu} \cdot T_C + T_{switch}$ after the end of the last symbol of the PDCCH triggering the CSI report(s), and where $Z'_{ref}(n)$, is defined as the next uplink symbol with its CP starting $T'_{proc, CSI} = (Z')(2048 + 144) \cdot k2^{-\mu} \cdot T_C$ after the end of the last symbol in time of the latest of: aperiodic CSI-RS resource for channel measurements, aperiodic CSI-IM used for interference measurements, and aperiodic NZP CSI-RS for interference measurement, when aperiodic CSI-RS is used for channel measurement for the n-th triggered CSI report, and where $T_{switch}$ is defined in clause 6.4 and is applied only if $Z_1$ of table 5.4-1 is applied.

Depending on whether a HARQ-ACK and a UL-SCH (or TB) are multiplexed with a PUSCH for transmitting a CSI report, the UE may ignore DCI triggering the CSI report as shown in Table 16.

k2_offset=ceil(z/c1)
k2_offset=floor(z/c2)
k2_offset=X+ceil(z'/c3)
k2_offset=X+floor(z'/c4)

TABLE 16

When the CSI request field on a DCI triggers a CSI report(s) on PUSCH, if the first uplink symbol to carry the corresponding CSI report(s) including the effect of the timing advance, starts earlier than at symbol $Z_{ref}$,
 - the UE may ignore the scheduling DCI if no HARQ-ACK or transport block is multiplexed on the PUSCH.
When the CSI request field on a DCI triggers a CSI report(s) on PUSCH, if the first uplink symbol to carry the n-th CSI report including the effect of the timing advance, starts earlier than at symbol $Z'_{ref}(n)$,
 - the UE may ignore the scheduling DCI if the number of triggered reports is one and no HARQ-ACK or transport block is multiplexed on the PUSCH
 - Otherwise, the UE is not required to update the CSI for the n-th triggered CSI report.

In this case, the values of c1, c2, c3, and c4 may be predefined, semi-statically configured by RRC, a MAC CE, etc., or dynamically configured by DCI. As the default values of c1, c2, c3, and c4, for example, 14, which is the number of symbols per slot, may be used, but the present disclosure is not limited thereto. Here, X denotes an A-CSI-RS triggering offset and may include the offset X described in Section 1.5 of this specification.

The method for obtaining k2_new and k2_offset, and/or the method for redefining or reinterpreting K2 based on Z, Z', and X may be configured and/or defined to be limitedly applied to a specific SCS (e.g., 480 and/or 960 kHz).

The method for obtaining k2_new and k2_offset and/or the method for redefining or reinterpreting K2 based on Z, Z', and X may be limitedly applied when a HARQ-ACK and/or UL-SCH (or TB) is not multiplexed with a PUSCH carrying a CSI report.

The method for obtaining k2_new and k2_offset and/or the method for redefining or reinterpreting K2 based on Z, Z', and X may be applied equally (or similarly) when a HARQ-ACK and/or a UL-SCH (or TB) is multiplexed with a PUSCH carrying a CSI report.

The method for obtaining k2_new and k2_offset and/or the method for redefining or reinterpreting K2 based on Z, Z', and X may be applied only when there is one CSI report triggered by DCI. Alternatively, the method may be applied, regardless of the number of triggered CSI reports.

7) Method of Determining Delay Requirements of Aperiodic CSI Reporting

In the conventional NR system, CSI reporting latency is defined per CSI content for each numerology (SCS) within the following frequency range: FR1 or FR2-1 (under 52.6 GHz) based on Tables 17 and 18. CSI reporting (i.e., each CSI report setting) may be classified into three latency classes, and for each class, Z1 (low-latency class), Z2 (high-latency class), and Z3 (other cases) defined in Table 18 are applied as delay requirements. In addition, Table 17 is defined for ultra-low latency requirements, which are lower than low latency requirements.

Table 17 is equivalent to Table 5.4-1: CSI computation delay requirement 1 of 3GPP 38.214, and Table 18 is equivalent to Table 5.4-2: CSI computation delay requirement 2 of 3GPP 38.214.

TABLE 17

| | $Z_1$ [symbols] | |
|---|---|---|
| μ | $Z_1$ | $Z'_1$ |
| 0 | 10 | 8 |
| 1 | 13 | 11 |
| 2 | 25 | 21 |
| 3 | 43 | 36 |

TABLE 18

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $min(44, X_2 + KB_1)$ | $X_2$ |
| 3 | 97 | 85 | 152 | 140 | $min(97, X_3 + KB_2)$ | $X_3$ |

For example, Z1 and Z1' in Table 18 are applied to CSI reporting to which the following three are applied simultaneously.

Wideband frequency-granularity

A single CSI-RS resource (i.e., no CRI reporting) with at most 4 CSI-RS ports

PMI reporting with Type I Single-Panel codebook or non-PMI reporting

Z3 and Z3' are applied for L1-RSRP reporting (i.e., beam management), and Z2 and Z2' are delay requirements applied for reporting of other CSI contents.

Specifically, Table 17 shows requirements to support ultra-low latency. This is delay requirements applied when a CSI report of the low-latency class is triggered (i.e., a CSI report setting to which Z1 and Z1' of Table 5.4-2 are applied) and when a specific condition is satisfied (e.g., if all CSI processing units (CPUs) of the UE are unoccupied and a UL-SCH or HARQ-ACK is not multiplexed to a PUSCH on which the CSI report is transmitted). The contents in Table 19 are defined in TS 38.214.

TABLE 19

- $(Z_1, Z'_1)$ of the table 5.4-1 if the CSI is triggered without a PUSCH with either transport block or HARQ-ACK or both when L = 0 CPUs are occupied (according to Clause 5.2.1.6) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or

- $(Z_1, Z'_1)$ of the table 5.4-2 if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or

- $(Z_1, Z'_1)$ of the table 5.4-2 if the CSI to be transmitted corresponds to wideband frequency-granularity where the reportQuantity is set to 'ssb-Index-SINR', or reportQuantity is set to 'cri-SINR', or

- $(Z_1, Z'_1)$ of the table 5.4-2 if reportQuantity is set to 'cri-RSRP' or 'ssb-Index-RSRP', where $X_\mu$ is according to UE reported capability beamReportTiming and $KB_1$ is according to UE reported capability beamSwitchTiming as defined in [13, TS 38.306], or

- $(Z_1, Z'_2)$ of table 5.4-2 otherwise.

For an SCS (e.g., 480 kHz or 960 kHz) used in FR2-2 (52.6 to 71 GHz) or high frequency bands (above 52.6 GHz), if the delay requirements for ultra-low latency shown in Table 17 are not configured, time requirements for the corresponding single CSI report may need to be established.
Proposed Method 1.7-1

For an SCS (e.g., 480 and/or 960 kHz SCS or higher) used in high frequency bands (e.g., above 52.6 GHz), if only one delay requirement is defined (i.e. no delay requirements are defined for the ultra-low latency class), a CSI report is subject to the one delay requirement regardless of whether a UL-SCH or HARQ-ACK is multiplexed with a PUSCH on which the corresponding CSI report is transmitted and/or the number of CPUs used by the UE when the UE transmits the CSI report (or when the UE receives a CSI-RS). In an embodiment, for report 1 and report 2 where the same CSI report of the low latency class is configured, even if report 1 is multiplexed with a HARQ-ACK and transmitted over a specific PUSCH and even if report 2 is transmitted over another specific PUSCH without multiplexing, the delay requirements of report 1 and report 2 may be the same. In another embodiment, for report 1 for UE 1 and report 2 for UE 2 where the same CSI report of the low latency class is configured, even if all CPUs of UE 1 are unoccupied at the time of CSI triggering (or CSI-RS reception) and some CPUs of UE 2 are occupied at the time of CSI triggering (or CSI-RS reception), the delay requirements of report 1 for UE 1 and report 2 for UE 2 may be the same.
Proposed Method 1.7-2

For an SCS (e.g., 480 and/or 960 kHz SCS or higher) used in high frequency bands (e.g., above 52.6 GHz), if only one delay requirement is defined (i.e., no delay requirements are defined for the ultra-low latency class), the UE does not expect CSI report settings corresponding to the following three conditions.

Wideband Frequency-Granularity
  A single CSI-RS resource (i.e., no CRI reporting) with at most 4 CSI-RS ports
  PMI reporting with Type I Single-Panel codebook or non-PMI reporting Specifically, the UE may expect no CSI report settings corresponding to the three conditions at the same time. Alternatively, the UE may expect no CSI report settings corresponding to some (or one) of the three conditions.

In general, for the SCS (e.g., 480 and/or 960 kHz SCS or higher) used in high frequency bands (e.g., above 52.6 GHz), the UE may be configured to expect no CSI report settings corresponding to all or some of the three conditions.

1.8. Method of Applying Delay Requirements of Aperiodic CSI Reporting

The CSI computation delay requirements for the 480 and/or 960 kHz SCS in FR2-2 bands are newly defined by computation delay requirement 2 of TS 38.214 Table 5.4-2. Thus, Table 5.4-2 of 3GPP TS 38.214, which defines the CSI computation delay requirements, may be changed from Table 18 to Table 20. However, Table 17 is used with no change.

TABLE 20

| μ | $Z_1$ [symbols] | | $Z_2$ [symbols] | | $Z_3$ [symbols] | |
|---|---|---|---|---|---|---|
|   | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | min(44, $X_2$ + $KB_1$) | $X_2$ |
| 3 | 97 | 85 | 152 | 140 | min(97, $X_3$ + $KB_2$) | $X_3$ |
| 5 | 388 | 340 | 608 | 560 | min(388, $X_5$ + $KB_3$) | $X_5$ |
| 6 | 776 | 680 | 1216 | 1120 | min(776, $X_6$ + $KB_4$) | $X_6$ |

In this case, the value of μ is defined as min (μPDCCH, μCSI-RS, μUL). Referring to Clause 5.4 of 3GPP TS 38.214, it may be seen that 'μ of table 5.4-1 and table 5.4-2 corresponds to the min ($\mu_{PDCCH}$, $\mu_{CSI-RS}$, $\mu_{UL}$) where the $\mu_{PDCCH}$ corresponds to the subcarrier spacing of the PDCCH with which the DCI was transmitted and $\mu_{UL}$ corresponds to the subcarrier spacing of the PUSCH with which the CSI report is to be transmitted and $\mu_{CSI-RS}$ corresponds to the minimum subcarrier spacing of the A-CSI-RS triggered by the DCI'.

That is, the CSI computation delay requirements are determined based on the smallest value among $\mu_{PDCCH}$, $\mu_{CSI-RS}$, and $\mu_{UL}$. For a mixed numerology case in which μ=5 or μ=6 and a smaller value (e.g., μ=4) among $\mu_{PDCCH}$, $\mu_{CSI-RS}$, and $\mu_{UL}$ are mixed, it may be regulated which CSI calculation delay requirement is applied.

The present disclosure proposes methods of applying CSI computation delay requirements in the following three cases.

When the values of $\mu_{PDCCH}$, $\mu_{CSI-RS}$, and $\mu_{UL}$ are all more than or equal to 5
  When at least one of the values of $\mu_{PDCCH}$, $\mu_{CSI-RS}$, and $\mu_U$ is more than or equal to 5
  When the value of $\mu_{CSI-RS}$ is more than or equal to 5

Specifically, the UE and/or network (or gNB) may operate according to Method 1.8-1, 1.8-2a, 1.8-2b, 1.8-2c, 1.8-3a and/or 1.8-3b. The UE and/or network may operate according to one of these methods or any combination of two or more methods.

Method 1.8-1

When min ($\mu_{PDCCH}$, $\mu_{CSI-RS}$, $\mu_{UL}$)=5 or min ($\mu_{PDCCH}$, $\mu_{CSI-RS}$, $\mu_{UL}$)=6, Table 20 above is used. Which one of Z1 (and Z1'), Z2 (and Z2'), and Z3 (and Z3') is applied may be determined according to the triggered CSI report as in the conventional communication system. In particular, when a CSI report to which Z1 (and Z1') is applied is triggered, the values of Z1 and Z1' in Table 20 are used as the CSI computation delay requirements even in a situation where there is no occupied CPU and no HARQ-ACK or data is multiplexed with a PUSCH (that is, in Rel-15/16, the delay requirements of Z1 and Z1' of Table 17 are applied, which corresponds to the condition of using Table 17 described above in Section 1.7).

Method 1.8-2a

If at least one of $\mu_{PDCCH}$, $\mu_{CSI-RS}$, and $\mu_{UL}$ is 5 or 6, Table 20 is used. Therefore, if at least one of $\mu_{PDCCH}$, $\mu_{CSI-RS}$, and $\mu_{UL}$ has a numerology of 5 or higher, Table 17 is not used. For example, in the case of $\mu_{PDCCH}$=3, $\mu_{CSI-RS}$=3, and $\mu_{UL}$=5, the values defined in Table 20 may be used as the CSI computation delay requirements. In this case, since $\mu_{PDCCH}$=3 is the minimum value, one of Z1 (and Z1'), Z2 (and Z2'), and Z3 (and Z3') corresponding to μ=3 in Table 20 is used depending on the type of triggered CSI report. In particular, when a CSI report to which Z1 (and Z1') is applied is triggered, the values of Z1 and Z1' in Table 20 are used as the CSI computation delay requirements even in a situation where there is no occupied CPU and no HARQ-ACK or data (TB) is multiplexed with a PUSCH (that is, in Rel-15/16, the delay requirements of Z1 and Z1' of Table 5.4-1 are applied, which corresponds to the condition of using Table 5.4-1 described above in Section 1.7).

Method 1.8-2b

When at least one of a plurality of numerologies for A-CSI-RSs triggered by $\mu_{PDCCH}$, $\mu_{UL}$, and a PDCCH (DCI) is 5 or 6, Table 20 is used. For example, if $\mu_{PDCCH}$=5, Table 20 is used as the CSI computation delay requirements regardless of the values of $\mu_{CSI-RS}$ and $\mu_{UL}$. As another example, when $\mu_{PDCCH}$=3, when $\mu_{UL}$=3, and when a plurality of numerologies for two A-CSI-RSs triggered by a corresponding PDCCH are μ=3 and μ=5, respectively, Table 20 is used for the CSI computation delay requirements even though min ($\mu_{PDCCH}$, $\mu_{CSI-RS}$, $\mu_{UL}$)=3 because a CSI-RS with a numerology of 5 or more is configured by the corresponding PDCCH.

Method 1.8-2c

If at least one of $\mu_{PDCCH}$, $\mu_{CSI-RS}$, and $\mu_{UL}$ has a value of 3 or less, Table 17 or Table 20 above is used. The delay applied depending on the type of triggered CSI report is determined as one of Z1 (and Z1'), Z2 (and Z2'), and Z3 (and Z3'). When a CSI report to which a specific situation (i.e., Z1 and Z1') is applied is triggered, one of Tables 17 and 20 is selected and applied depending on a situation where there is no occupied CPU and no HARQ-ACK or data is multiplexed with a PUSCH (that is, in Rel-15/16, the delay requirements of Z1 and Z1' of Table 5.4-1 are applied, which corresponds to the condition of using Table 17 described above in Section 1.7).

Method 1.8-3a

When the value of $\mu_{CSI-RS}$ is 5 or 6, Table 20 above is used. Therefore, when the value of $\mu_{CSI-RS}$ is more than or equal to 5, Table 20 is used regardless of the values of $\mu_{PDCCCH}$ and/or $\mu_{UL}$. For example, when $\mu_{CSI-RS}$=6, Table 20 is used. In particular, when a CSI report to which Z1 (and Z1') is applied is triggered, the values of Z1 and Z1' in Table 20 are used as the CSI computation delay requirements even in a situation where there is no occupied CPU and no HARQ-ACK or data is multiplexed with a PUSCH (that is, in Rel-15/16, the delay requirements of Z1 and Z1' of Table 5.4-1 are applied, which corresponds to the condition of using Table 17 described above in Section 1.7).

Method 1.8-3b

When at least one of the numerologies of A-CSI-RSs triggered by a PDCCH (DCI) is 5 or 6, Table 20 is used. Therefore, if at least one of the numerologies of the A-CSI-RSs triggered by the PDCCH is 5 or more, Table 20 is used regardless of the values of $\mu_{PDCCH}$, $\mu_{UL}$, and/or $\mu_{CSI-RS}$. In particular, when a CSI report to which Z1 (and Z1') is applied is triggered, the values of Z1 and Z1' in Table 20 are used as the CSI computation delay requirements even in a situation where there is no occupied CPU and no HARQ-ACK or data is multiplexed with a PUSCH (that is, in Rel-15/16, the delay requirements of Z1 and Z1' of Table 5.4-1 are applied, which corresponds to the condition of using Table 17 described above in Section 1.7).

1.9. CPU Occupancy of Aperiodic CSI Report

In Clause 5.2.1.6 (CSI processing criteria) of TS 38.214, the rules shown in Table 21 are described regarding CPUs used/occupied by the UE to process an aperiodic CSI report when the CSI report is triggered.

TABLE 21

A UE is not expected to be configured with an aperiodic CSI trigger state containing more than $N_{CPU}$ Reporting Settings. Processing of a CSI report occupies a number of CPUs for a number of symbols as follows:
- $O_{CPU}$ = 0 for a CSI report with CSI-ReportConfig with higher layer parameter reportQuantity set to 'none' and CSI-RS-ResourceSet with higher layer parameter trs-Info configured
- $O_{CPU}$ = 1 for a CSI report with CSI-ReportConfig with higher layer parameter reportQuantity set to 'cri-RSRP', 'ssb-Index-RSRP', 'cri-SINR', 'ssb-Index-SINR' or 'none' (and CSI-RS-ResourceSet with higher layer parameter trs-Info not configured)
- for a CSI report with CSI-ReportConfig with higher layer parameter reportQuantity set to 'cri-RI-PMI-CQI', 'cri-RI-i1', 'cri-RI-i1-CQI', 'cri-RI-CQI', or 'cri-RI-LI-PMI-CQI',
  - if a CSI report is aperiodically triggered without transmitting a PUSCH with either transport block or HARQ-ACK or both when L = 0 CPUs are occupied, where the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI', $O_{CPU}$ = $N_{CPU}$,
  - otherwise, $O_{CPU}$ = $K_S$, where $K_s$ is the number of CSI-RS resources in the CSI-RS resource set for channel measurement.

According to Table 21, when a specific situation and/or a specific CSI report setting is triggered, the UE operates to use/occupy all available CPUs. The specific situation corresponds to the condition of using Table 17 described in Section 1.7. That is, the specific situation means that there is no CPU occupied when CSI is triggered and no HARQ-ACK or data (=TB) is multiplexed with a PUSCH on which the CSI report is transmitted. In addition, the specific CSI report setting corresponds to the condition of using Table 17 described above in Section 1.7 above. That is, the specific CSI report setting means that 'the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI''. As describe above, when the UE is configured to use/occupy all CPUs in the specific situation/configuration, the short processing delay in Table 17 above may be satisfied. In other words, all CPUs of the UE are used and/or occupied only for the specific situation and the specific CSI report setting where the short processing delay is applied as shown in Table 17.

On the other hand, for the 480 and/or 960 kHz SCS, only CSI computation delay requirement 2 may be defined and applied (as described above). That is, since CSI computation delay requirement 1 is not defined for the 480 and/or 960 kHz SCS, the UE does not need to use/occupy all CPUs to process a CSI report in which the corresponding SCS/numerology is configured. In other words, the operation of using/occupying all CPUs to process one CSI report as long as CSI computation delay requirement 2 (for a relatively long time period compared to requirement 1) may be inefficient use of CPUs. Since all CPUs are used/occupied during the corresponding time, all aperiodic CSI reports triggered during the time may not be updated.

When Table 17 is not used as the CSI calculation delay requirements, the operation of the UE needs to be changed so that all CPUs of the UE are not used/occupied.

In Section 1.9, methods of applying the CSI calculation delay requirements in the following three cases will be described.

When the values of $\mu_{PDCCH}$, $\mu_{CSI-RS}$, and $\mu_{UL}$ are all more than or equal to 5

When at least one of the values of $\mu_{PDCCH}$, $\mu_{CSI-RS}$, and $\mu_{UL}$ is more than or equal to 5

When the value of $\mu_{CSI-RS}$ is more than or equal to 5

Specifically, the UE and/or network (or gNB) may operate according to Method 1.9-1, 1.9-2, and/or 1.9-3 proposed below. The UE and/or network may operate according to one of these methods or any combination of two or more. For other cases, if Table 17 is not defined/used/applied as the CSI computation delay requirements of aperiodic CSI reporting, the UE may be configured to use/occupy only some of the available CPUs (for example, $O_{CPU}=K_s$ where $K_s$ is the number of CSI-RS resources in the CSI-RS resource set for channel measurement), instead of using/occupying all CPUs.

Method 1.9-1

When min ($\mu_{PDCCH}$, $\mu_{CSI-RS}$, $\mu_{UL}$)=5 or min ($\mu_{PDCCH}$, $\mu_{CSI-RS}$, $\mu_{UL}$)=6, Table 20 is used/applied as the CSI calculation delay requirements, but Table 17 is not used/applied. In this case, the UE is configured to use/occupy only some of the available CPUs (e.g., $O_{CPU}=K_s$, where $K_s$ is the number of CSI-RS resources in the CSI-RS resource set for channel measurement). Accordingly, the rules of Table 21 may be appropriately modified by reflecting Method 1.9-1. For example, the rules may be modified as shown in Table 22 or Table 23, but the present disclosure is not limited thereto.

TABLE 22

- if NOT(min($\mu_{PDCCH}$, $\mu_{CSI-RS}$, $\mu_{UL}$)>=5), and, if a CSI report is aperiodically triggered without transmitting a PUSCH with either transport block or HARQ-ACK or both when L = 0 CPUs are occupied, where the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI', $O_{CPU} = N_{CPU}$,
- otherwise, $O_{CPU} = K_s$, where $K_s$ is the number of CSI-RS resources in the CSI-RS resource set for channel measurement.

TABLE 23

- if max($\mu_{PDCCH}$, $\mu_{CSI-RS}$, $\mu_{UL}$)<5, and, if a CSI report is aperiodically triggered without transmitting a PUSCH with either transport block or HARQ-ACK or both when L = 0 CPUs are occupied, where the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI', $O_{CPU} = N_{CPU}$,
- otherwise, $O_{CPU} = K_s$, where $K_s$ is the number of CSI-RS resources in the CSI-RS resource set for channel measurement.

Method 1.9-2

If at least one of the values of $\mu_{PDCCH}$, $\mu_{CSI-RS}$, and $\mu_{UL}$ is 5 or 6, Table 20 is used and/or applied as the CSI computation delay requirements of CSI reporting, and Table 17 is not used and/or applied. Alternatively, the condition may be replaced with one of the numerologies of A-CSI-RSs triggered by a PDCCH (DCI) rather than $\mu_{CSI-RS}$ as in Method 1.8-2b. The UE may be configured to use and/or occupy only some of the available CPUs, instead of using/occupying all CPUs. For example, $O_{CPU}=K_s$, where $K_s$ is the number of CSI-RS resources in the CSI-RS resource set for channel measurement. Accordingly, the rules in Table 21 may be appropriately modified by reflecting Method 1.9-2. For example, the rules may be modified as shown in Table 24 or Table 25, but the present disclosure is not limited thereto.

TABLE 24

- if NOT(max($\mu_{PDCCH}$, $\mu_{CSI-RS}$, $\mu_{UL}$)>=5), and, if a CSI report is aperiodically triggered without transmitting a PUSCH with either transport block or HARQ-ACK or both when L = 0 CPUs are occupied, where the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI', $O_{CPU} = N_{CPU}$,

TABLE 24-continued

- otherwise, $O_{CPU} = K_s$, where $K_s$ is the number of CSI-RS resources in the CSI-RS resource set for channel measurement.

TABLE 25

- if $\min(\mu_{PDCCH}, \mu_{CSI-RS}, \mu_{UL}) < 5$, and, if a CSI report is aperiodically triggered without transmitting a PUSCH with either transport block or HARQ-ACK or both when L = 0 CPUs are occupied, where the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI', $O_{CPU} = N_{CPU}$,
- otherwise, $O_{CPU} = K_s$, where $K_s$ is the number of CSI-RS resources in the CSI-RS resource set for channel measurement.

Method 1.9-3

If the value of $\mu_{CSI-RS}$ is 5 or 6, Table 20 is used and/or applied as the CSI computation delay requirements of CSI reporting, and Table 17 is used and/or not applied. Alternatively, the condition may be replaced with one of the numerologies of A-CSI-RSs triggered by a PDCCH (DCI) rather than $\mu_{CSI-RS}$ as in Method 1.8-3b. Instead of using/occupying all CPUs, the UE may be configured to use and/or occupy only some of the available CPUs. For example, $O_{CPU} = K_s$, where $K_s$ is the number of CSI-RS resources in the CSI-RS resource set for channel measurement. Accordingly, the rules in Table 21 may be appropriately modified by reflecting Method 1.9-2. For example, the rules may be modified as shown in Table 26 or Table 27, but the present disclosure is not limited thereto.

TABLE 26

- if NOT($\mu_{CSI-RS} \geq 5$), and, if a CSI report is aperiodically triggered without transmitting a PUSCH with either transport block or HARQ-ACK or both when L = 0 CPUs are occupied, where the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI', $O_{CPU} = N_{CPU}$,
- otherwise, $O_{CPU} = K_s$, where $K_s$ is the number of CSI-RS resources in the CSI-RS resource set for channel measurement.

TABLE 27

- if $\mu$CSI-RS <5, and, if a CSI report is aperiodically triggered without transmitting a PUSCH with either transport block or HARQ-ACK or both when L = 0 CPUs are occupied, where the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI', $O_{CPU} = N_{CPU}$,
- otherwise, $O_{CPU} = K_s$, where $K_s$ is the number of CSI-RS resources in the CSI-RS resource set for channel measurement.

1.10. Extra PDSCH Processing Time

As described in Clause 5.3 of 3GPP TS 38.214 (see Table 28), if the interval from the last symbol of a PDSCH to the first symbol of a PUCCH in which the HARQ-ACK for the PDSCH is transmitted is guaranteed to be greater than $T_{proc,1}$, the UE may provide a valid HARQ-ACK.

TABLE 28

If the first uplink symbol of the PUCCH which carries the HARQ-ACK information, as defined by the assigned HARQ-ACK timing K1 and the PUCCH resource to be used and including the effect of the timing advance, starts no earlier than at symbol L1, where L1 is defined as the next uplink symbol with its CP starting after $T_{proc,1} = (N_1 + d_{1,1} + d_2)(2048 + 144) \cdot \kappa 2^{-\mu} \cdot T_C + T_{ext}$ after the end of the last symbol of the PDSCH carrying the TB being acknowledged, then the UE shall provide a valid HARQ-ACK message.
- $N_1$ is based on μ of table 5.3-1 and table 5.3-2 for UE processing capability 1 and 2 respectively, where μ corresponds to the one of ($\mu_{PDCCH}, \mu_{PDSCH}, \mu_{UL}$) resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted, and κ is defined in clause 4.1 of [4, TS 38.211].
- For operation with shared spectrum channel access, $T_{ext}$ is calculated according to [4, TS 38.211], otherwise $T_{ext} = 0$.

TABLE 28-continued

- If the PDSCH DM-RS position $l_1$ for the additional DM-RS in Table 7.4.1.1.2-3 in clause 7.4.1.1.2 of [4, TS 38.211] is $l_1 = 12$ then $N_{1, 0} = 14$ in Table 5.3-1, otherwise $N_{1, 0} = 13$.
- If the UE is configured with multiple active component carriers, the first uplink symbol which carries the HARQ-ACK information further includes the effect of timing difference between the component carriers as given in [11, TS 38.133].
- For the PDSCH mapping type A as given in clause 7.4.1.1 of [4, TS 38.211]: if the last symbol of PDSCH is on the i-th symbol of the slot where i < 7, then $d_{1, 1} = 7 - i$, otherwise $d_{1, 1} = 0$
- If a PUCCH of a larger priority index would overlap with PUCCH/PUSCH of a smaller priority index, $d_2$ for the PUCCH of a larger priority is set as reported by the UE; otherwise $d_2 = 0$.
- For UE processing capability 1: If the PDSCH is mapping type B as given in clause 7.4.1.1 of [4, TS 38.211], and
  - if the number of PDSCH symbols allocated is L ≥ 7, then $d_{1, 1} = 0$,
  - if the number of PDSCH symbols allocated is L ≥ 4 and L ≤ 6, then $d_{1, 1} = 7 - L$.
  - if the number of PDSCH symbols allocated is L = 3 then $d_{1, 1} = 3 + \min (d, 1)$, where d is the number of overlapping symbols of the scheduling PDCCH and the scheduled PDSCH.
  - if the number of PDSCH symbols allocated is 2, then $d_{1, 1} = 3 + d$, where d is the number of overlapping symbols of the scheduling PDCCH and the scheduled PDSCH.

...

If the number of symbols of each PDSCH is less than a specific number, $d_{1,1}$ may be understood as an extra processing time added to secure the PDSCH processing time, and $d_2$ may be understood as an extra processing time added when a PUCCH having a larger priority index overlaps with a PUCCH/PUSCH having a smaller priority index.

It is expected that the values of N1 will be newly defined for the 480 and/or 960 kHz SCS in FR2-2 bands. The newly defined N1 value for 480 kHz may be X1 times greater than the N1 value for the 120 kHz SCS, and the newly defined N1 value for 960 kHz may be X2 times greater than the N1 value for the 120 kHz SCS. For example, if X1=4 and X2=8 are used to secure the same absolute time as the processing time for 120 kHz, the N1 values for 480 and 960 kHz may be defined to be 4 times and 8 times greater than the N1 value for 120 kHz, respectively.

Considering that N1, $d_{1,1}$, and $d_2$ are added with the same rate in calculating $T_{proc,1}$, the same scaling needs to be applied to $N_1$, $d_{1,1}$, and $d_2$. In other words, when the value of $N_1$ newly defined for a specific SCS is scaled X times compared to the conventional one, $d_{1,1}$ and/or $d_2$ also needs to be scaled X times. For example, when $d_{1,1}=1$, N1 for 120 kHz is 20 symbols as shown in Table 9. Thus, it is expected that $d_{1,1}=1$ has the effect of 5% of extra processing time, compared to N1. Since N1 for 960 kHz is 160 symbols, it is expected that $d_{1,1}=1$ has the effect of 0.6% of the extra processing time, compared to N1. As another example, when $d_{1,1}=6$, it is expected for 120 kHz that when $d_{1,1}$ is added, the processing time will increase about 30%. However, for 960 kHz, it is expected that the processing time will increase up to about 3.75%. Therefore, scaling may need to be performed for N1 and $d_{1,1}$ with the same rate as. Similarly, scaling may need to be performed for $d_2$.

Method 1.10-1

When $T_{proc,1}$ is calculated, $d_{1,1}$ and/or $d_2$ are scaled 4 times for the 480 kHz SCS, and $d_{1,1}$ and/or $d_2$ are scaled 8 times for the 960 kHz SCS. In the following embodiments, methods of scaling $d_{1,1}$ and/or $d_2$ will be described.

Embodiment 1.10-1-1: For the 480 kHz SCS, the rules for $d_{1,1}$ and/or $d_2$ defined in conventional Rel-15/16 may be changed as shown in Table 29.

TABLE 29

For the PDSCH mapping type A as given in clause 7.4.1.1 of [4, TS 38.211]: if the last symbol of PDSCH is on the i-th symbol of the slot where i < 7, then $d_{1, 1} = 4*(7 - i)$, otherwise $d_{1, 1} = 0$
- If a PUCCH of a larger priority index would overlap with PUCCH/PUSCH of a smaller priority index, $d_2$ for the PUCCH of a larger priority is set as a value multiplied by 4 times the value reported by the UE; otherwise $d_2 = 0$.
- For UE processing capability 1: If the PDSCH is mapping type B as given in clause 7.4.1.1 of [4, TS 38.211], and
  - if the number of PDSCH symbols allocated is L ≥ 7, then $d_{1, 1} = 0$,
  - if the number of PDSCH symbols allocated is L ≥ 4 and L ≤ 6, then $d_{1, 1} = 4*(7 - L)$.
  - if the number of PDSCH symbols allocated is L = 3 then $d_{1, 1} = 4*(3 + \min (d, 1))$, where d is the number of overlapping symbols of the scheduling PDCCH and the scheduled PDSCH.
  - if the number of PDSCH symbols allocated is 2, then $d_{1, 1} = 4*(3 + d)$, where d is the number of overlapping symbols of the scheduling PDCCH and the scheduled PDSCH.

In this case, determination of $d_{1,1}$ and/or $d_2$ is not limited to the method described in Embodiment 1.10-1-1, and the value of $d_{1,1}$ and/or $d_2$ may be modified for each case. For example, for PDSCH mapping type A, $d_{1,1}$ may be calculated by $d_{1,1}=4*(7-i)$ or $d_{1,1}=4*7-i$. In addition, a value reported by the UE may be used as $d_2$ without scaling, or $d_2$ may be defined in another form even if it is scaled 4 times. For PDSCH mapping type B, when L>=4 and L<=6, $d_{1,1}$ may be calculated by $d_{1,1}=4*(7-L)$ or $d_{1,1}=4*7-L$. When L=3, $d_{1,1}$ may be calculated by $d_{1,1}=4*(3+d)$, $d_{1,1}=4*3+d$, or $d_{1,1}=3+4*d$. When L=2, $d_{1,1}$ may be calculated by $d_{1,1}=4*(3+d)$, $d_{1,1}=4*3+d$, or $d_{1,1}=3+4*d$.

Embodiment 1.10-1-2: For the 960 kHz SCS, the rules for $d_{1,1}$ and/or $d_2$ defined in conventional Rel-15/16 may be changed as shown in Table 30.

TABLE 30

For the PDSCH mapping type A as given in clause 7.4.1.1 of [4, TS 38.211]: if the last
symbol of PDSCH is on the i-th symbol of the slot where i < 7, then $d_{1,1} = 8*(7 - i)$,
otherwise $d_{1,1} = 0$
- If a PUCCH of a larger priority index would overlap with PUCCH/PUSCH of a smaller
  priority index, $d_2$ for the PUCCH of a larger priority is set as a value multiplied by 8 times
  the value reported by the UE; otherwise $d_2 = 0$.
- For UE processing capability 1: If the PDSCH is mapping type B as given in clause 7.4.1.1
  of [4, TS 38.211], and
  - if the number of PDSCH symbols allocated is L ≥ 7, then $d_{1,1} = 0$,
  - if the number of PDSCH symbols allocated is L ≥ 4 and L ≤ 6, then $d_{1,1} = 8*(7 - L)$.
  - if the number of PDSCH symbols allocated is L = 3 then $d_{1,1} = 8*(3 + \min(d, 1))$, where
    d is the number of overlapping symbols of the scheduling PDCCH and the scheduled
    PDSCH.
  - if the number of PDSCH symbols allocated is 2, then $d_{1,1} = 8*(3 + d)$, where d is the
    number of overlapping symbols of the scheduling PDCCH and the scheduled PDSCH.

In this case, determination of $d_{1,1}$ and/or $d_2$ is not limited to the method described in Embodiment 1.10-1-2, and the value of $d_{1,1}$ and/or $d_2$ may be modified for each case. For example, for PDSCH mapping type A, $d_{1,1}$ may be calculated by $d_{1,1}=8*(7-i)$ or $d_{1,1}=8*7-i$. In addition, a value reported by the UE may be used as $d_2$ without scaling, or $d_2$ may be defined in another form even if it is scaled 8 times. For PDSCH mapping type B, when L>=4 and L<=6, $d_{1,1}$ may be calculated by $d_{1,1}=8*(7-L)$ or $d_{1,1}=8*7-L$. When L=3, $d_{1,1}$ may be calculated by $d_{1,1}=8*(3+\min(d,l))$, $d_{1,1}=8*3+\min(d,l)$, or $d_{1,1}=3+8*\min(d,l)$. When L=2, $d_{1,1}$ may be calculated by $d_{1,1}=8*(3+d)$, $d_{1,1}=8*3+d$, or $d_{1,1}=3+8*d$.

Method 1.10-2

When $T_{proc,1}$ is calculated, $d_{1,1}$ is scaled $X_1$ times and $d_2$ is scaled $X_2$ times for the 480 kHz SCS. For the 960 kHz SCS, $d_{1,1}$ is scaled $Y_1$ times and $d_2$ is scaled $Y_2$ times. The values of $X_1$, $X_2$, $Y_1$, and $Y_2$ may be predefined for each SCS. Alternatively, the values may be configured by higher layer signaling such as RRC or configured by DCI. In the following embodiments, methods of scaling $d_{1,1}$ and/or $d_2$ will be described.

Embodiment 1.10.2-1: For the 480 kHz SCS, the rules for $d_{1,1}$ and/or $d_2$ defined in conventional Rel-15/16 may be changed as shown in Table 31.

TABLE 31

For the PDSCH mapping type A as given in clause 7.4.1.1 of [4, TS 38.211]: if the last
symbol of PDSCH is on the i-th symbol of the slot where i < 7, then $d_{1,1} = X1*(7 - i)$,
otherwise $d_{1,1} = 0$
- If a PUCCH of a larger priority index would overlap with PUCCH/PUSCH of a smaller
  priority index, $d_2$ for the PUCCH of a larger priority is set as a value multiplied by X2
  times the value reported by the UE; otherwise $d_2 = 0$.
- For UE processing capability 1: If the PDSCH is mapping type B as given in clause 7.4.1.1
  of [4, TS 38.211], and
  - if the number of PDSCH symbols allocated is L ≥ 7, then $d_{1,1} = 0$,
  - if the number of PDSCH symbols allocated is L ≥ 4 and L ≤ 6, then $d_{1,1} = X1*(7 - L)$.
  - if the number of PDSCH symbols allocated is L = 3 then $d_{1,1} = X1*(3 + \min(d, 1))$,
    where d is the number of overlapping symbols of the scheduling PDCCH and the
    scheduled PDSCH.
  - if the number of PDSCH symbols allocated is 2, then $d_{1,1} = X1*(3 + d)$, where d is the
    number of overlapping symbols of the scheduling PDCCH and the scheduled PDSCH.

In this case, determination of $d_{1,1}$ and/or $d_2$ is not limited to the method described in Embodiment 1.10-2-1, and the value of $d_{1,1}$ and/or $d_2$ may be modified for each case. For example, for PDSCH mapping type A, $d_{1,1}$ may be calculated by $d_{1,1}=X_1*(7-i)$ or $d_{1,1}=X_1*7-i$. In addition, a value reported by the UE may be used as $d_2$ without scaling, or $d_2$ may be defined in another form even if it is scaled $X_2$ times. For PDSCH mapping type B, when L>=4 and L<=6, $d_{1,1}$ may be calculated by $d_{1,1}=X_1*(7-L)$ or $d_{1,1}=X_1*7-L$. When L=3, $d_{1,1}$ may be calculated by $d_{1,1}=X_1*(3+\min(d,l))$, $d_{1,1}=X_1*3+\min(d,l)$, or $d_{1,1}=3+X_1*\min(d,l)$. When L=2, $d_{1,1}$ may be calculated by $d_{1,1}=X_1*(3+d)$, $d_{1,1}=X_1*3+d$, or $d_{1,1}=3+X_1*d$.

Embodiment 1.10-2-2: For the 960 kHz SCS, the rules for $d_{1,1}$ and/or $d_2$ defined in conventional Rel-15/16 may be changed as shown in Table 32.

TABLE 32

For the PDSCH mapping type A as given in clause 7.4.1.1 of [4, TS 38.211]: if the last
symbol of PDSCH is on the i-th symbol of the slot where i < 7, then $d_{1,1} = Y1*(7 - i)$, TABLE 32-continued otherwise $d_{1,1} = 0$
- If a PUCCH of a larger priority index would overlap with PUCCH/PUSCH of a smaller priority index, $d_2$ for the PUCCH of a larger priority is set as a value multiplied by Y2 times the value reported by the UE; otherwise $d_2 = 0$.
- For UE processing capability 1: If the PDSCH is mapping type B as given in clause 7.4.1.1 of [4, TS 38.211], and
  - if the number of PDSCH symbols allocated is L ≥ 7, then $d_{1,1} = 0$,
  - if the number of PDSCH symbols allocated is L ≥ 4 and L ≤ 6, then $d_{1,1} = Y1*(7 - L)$.
  - if the number of PDSCH symbols allocated is L = 3 then $d_{1,1} = Y1*(3 + \min(d, 1))$, where d is the number of overlapping symbols of the scheduling PDCCH and the scheduled PDSCH.
  - if the number of PDSCH symbols allocated is 2, then $d_{1,1} = Y1*(3 + d)$, where d is the number of overlapping symbols of the scheduling PDCCH and the scheduled PDSCH.

In this case, determination of $d_{1,1}$ and/or $d_2$ is not limited to the method described in Embodiment 1.10-2-2, and the value of $d_{1,1}$ and/or $d_2$ may be modified for each case. For example, for PDSCH mapping type A, $d_{1,1}$ may be calculated by $d_{1,1}=Y_1*(7-i)$ or $d_{1,1}=Y_1*7-i$. In addition, a value reported by the UE may be used as $d_2$ without scaling, or $d_2$ may be defined in another form even if it is scaled $Y_2$ times. For PDSCH mapping type B, when L>=4 and L<=6, $d_{1,1}$ may be calculated by $d_{1,1}=Y_1*(7-L)$ or $d_{1,1}=Y_1*7-L$. When L=3, $d_{1,1}$ may be calculated by $d_{1,1}=Y_1*(3+\min(d,l))$, $d_{1,1}=Y_1*3+\min(d,l)$, or $d_{1,1}=3+Y_1*\min(d,l)$. When L=2, $d_{1,1}$ may be calculated by $d_{1,1}=Y_1*(3+d)$, $d_{1,1}=Y_1*3+d$, or $d_{1,1}=3+Y_1*d$.

Additionally, the value of $T_{ext}$ may be scaled when $T_{proc,1}$ is calculated for the 480 or 960 kHz SCS. For example, $T_{ext}$ may have a non-zero value depending on specific situations (or when specific conditions are satisfied). When $T_{proc,1}$ is calculated for the 480 or 960 kHz SCS, the scaled value may be used instead of using the original value as it is. In this case, the value of $T_{ext}$ may be scaled 4 times for 480 kHz and 8 times for 960 kHz as described in the proposed methods for $d_{1,1}$ and $d_2$. Alternatively, the value of $T_{ext}$ may be scaled a predefined value or RRC configured value.

The methods of scaling the values of $d_{1,1}$, $d_2$, and/or $T_{ext}$ to calculate $T_{proc,1}$ may be applied to all or part of the $T_{proc,1}$ calculation. For example, $d_{1,1}$ is scaled 4 or 8 times depending on the SCS and then applied to the $T_{proc,1}$ calculation, and $d_2$ or $T_{ext}$ may be used in the calculation as it is.

The methods of scaling the values of $d_{1,1}$, $d_2$, and/or $T_{ext}$ may be applied regardless of PDSCH scheduling. For example, the methods may be applied even when there is one PDSCH scheduled by single DCI, and the methods may be equally applied when a plurality of PDSCHs are scheduled by single DCI.

1.11. Extra PUSCH Preparation Time

As described in Clause 6.4 of 3GPP TS 38.214 (see Table 33), if the interval from the last symbol of a PDCCH scheduling a PUSCH for TB transmission to the first symbol of the corresponding PUSCH is guaranteed to be greater than $T_{proc,2}$, the UE may transmit the corresponding TB.

TABLE 33

If the first uplink symbol in the PUSCH allocation for a transport block, including the DM-RS, as defined by the slot offset K2 and the start S and length L of the PUSCH allocation indicated by 'Time domain resource assignment' of the scheduling DCI and including the effect of the timing advance, is no earlier than at symbol L2, where L2 is defined as the next uplink symbol with its CP starting $T_{proc, 2} = \max((N_2 + d_{2,1} + d_2)(2048 + 144) \cdot \kappa 2^{-\mu} \cdot T_C + T_{ext} T_{switch}, d_{2, 2})$ after the end of the reception of the last symbol of the PDCCH carrying the DCI scheduling the PUSCH, then the UE shall transmit the transport block.
- $N_2$ is based on μ of Table 6.4-1 and Table 6.4-2 for UE processing capability 1 and 2 respectively, where μ corresponds to the one of ($\mu_{DL}$, $\mu_{UL}$) resulting with the largest $T_{proc, 2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and κ is defined in clause 4.1 of [4, TS 38.211].
- For operation with shared spectrum channel access, $T_{ext}$ is calculated according to [4, TS 38.211], otherwise $T_{ext} = 0$.
- If the first symbol of the PUSCH allocation consists of DM-RS only, then $d_{2,1} = 0$, otherwise $d_{2,1} = 1$.
- If the UE is configured with multiple active component carriers, the first uplink symbol in the PUSCH allocation further includes the effect of timing difference between component carriers as given in [11, TS 38.133].
- If the scheduling DCI triggered a switch of BWP, $d_{2,2}$ equals to the switching time as defined in [11, TS 38.133], otherwise $d_{2,2} = 0$.
- If a PUSCH of a larger priority index would overlap with PUCCH of a smaller priority index, $d_2$ for the PUSCH of a larger priority is set as reported by the UE; otherwise $d_2 = 0$.
- For a UE that supports capability 2 on a given cell, the processing time according to UE processing capability 2 is applied if the high layer parameter processingType2Enabled in PUSCH-ServingCellConfig is configured for the cell and set to 'enable',
- If the PUSCH indicated by the DCI is overlapping with one or more PUCCH channels, then the transport block is multiplexed following the procedure in clause 9.2.5 of [6, TS 38.213], otherwise the transport block is transmitted on the PUSCH indicated by the DCI.
- If uplink switching gap is triggered as defined in clause 6.1.6, $T_{switch}$ equals to the switching gap duration and for the UE configured with higher layer parameter TABLE 33-continued uplinkTxSwitchingOption set to 'dualUL' for uplink carrier aggregation
$\mu_{UL} = \min(\mu_{UL, carrier1}, \mu_{UL, carrier2})$, otherwise $T_{switch} = 0$.
Otherwise the UE may ignore the scheduling DCI.

In this case, if the first symbol of each PUSCH consists of DM-RSs only, $d_{2,1}=0$, and if a DM-RS and data are multiplexed in the first symbol, $d_{2,1}=1$. Herein, $d_2$ may be understood as an extra preparation time added when a PUSCH having a larger priority index overlaps with a PUCCH having a smaller priority index, and d2,2 may be understood as an extra time for when BWP switching is triggered.

When the values of N2 are newly defined for the 480 and/or 960 kHz SCS in FR2-2 bands, the N2 value for 480 kHz may be X1 times greater than the N2 value for the 120 kHz SCS, and the N2 value for 960 kHz may be X2 times greater than the N2 value for the 120 kHz SCS. For example, when X1=4 and X2=8, the N2 values for 480 and 960 kHz may be defined to be 4 times and 8 times greater than the N2 value for 120 kHz, respectively.

TABLE 34

| μ | PUSCH preparation time N$_2$ [symbols] |
|---|---|
| 3 (120 kHz) | 36 |
| 5 (480 kHz) | 144 |
| 6 (960 kHz) | 288 |

Considering that N2, $d_{2,1}$, and $d_2$ are added with the same rate in calculating $T_{proc,2}$, if the $N_2$ value is scaled X times for a specific SCS, $d_{2,1}$ and/or $d_2$ also needs to be scaled X times.

Method 1.11-1

When $T_{proc,2}$ is calculated, $d_{2,1}$ and/or $d_2$ are scaled 4 times for the 480 kHz SCS, and $d_{2,1}$ and/or $d_2$ are scaled 8 times for the 960 kHz SCS. In the following embodiments, methods of scaling $d_{2,1}$ and/or $d_2$ will be described.

Embodiment 1.11-1-1: For the 480 kHz SCS, if the first symbol of a PUSCH consists of DM-RSs only, $d_{2,1}=0$. Otherwise, $d_{2,1}=4$. In this case, $d_2$ is set to a value four times greater than a value reported by the UE if a PUSCH of a larger priority index would overlap with a PUCCH of a smaller priority index. Otherwise, $d_2$ is set to 0.

Embodiment 1.11-1-2: For the 960 kHz SCS, if the first symbol of a PUSCH consists of DM-RSs only, $d_{2,1}=0$. Otherwise, $d_{2,1}=8$. In this case, $d_2$ is set to a value 8 times greater than a value reported by the UE if a PUSCH of a larger priority index would overlap with a PUCCH of a smaller priority index. Otherwise, $d_2$ is set to 0.

Method 1.11-2

When $T_{proc,2}$ is calculated, $d_{2,1}$ and $d_2$ are scaled $X_1$ and $X_2$ times for the 480 kHz SCS, respectively, and $d_{2,1}$ and $d_2$ are scaled $Y_1$ and $Y_2$ times for the 960 kHz SCS, respectively. The values of $X_1$, $X_2$, $Y_1$, and $Y_2$ may be predefined for each SCS. Alternatively, the values may be configured by higher layer signaling such as RRC or configured by DCI. In the following embodiments, methods of scaling $d_{2,1}$ and/or $d_2$ will be described.

Embodiment 1.11-2-1: For the 480 kHz SCS, if the first symbol of a PUSCH consists of DM-RSs only, $d_{2,1}=0$. Otherwise, $d_{2,1}=X1$. In this case, $d_2$ is set to a value $X2$ times greater than a value reported by the UE if a PUSCH of a larger priority index would overlap with a PUCCH of a smaller priority index. Otherwise, $d_2$ is set to 0.

Embodiment 1.11-2-2: For the 960 kHz SCS, if the first symbol of a PUSCH consists of DM-RSs only, $d_{2,1}=0$. Otherwise, $d_{2,1}=Y1$. In this case, $d_2$ is set to a value Y2 times greater than a value reported by the UE if a PUSCH of a larger priority index would overlap with a PUCCH of a smaller priority index. Otherwise, $d_2$ is set to 0.

Determination of $d_{2,2}$ for 480 and 960 kHz SCSs

In Rel-15/16, the BWP switching time defined in TS 38.133 is used as $d_{2,2}$ used to calculate $T_{proc,2}$ for SCSs from 15 kHz to 120 kHz SCS, and the values thereof are shown in Table 35 (which is extracted from Clause 8.2.2.5 (Interruptions due to Active BWP switching Requirement) of TS 38.133).

TABLE 35

| μ | NR Slot length (ms) | Interruption length X (slots) |
|---|---|---|
| 0 | 1 | 1 |
| 1 | 0.5 | 1 |
| 2 | 0.25 | 3 |
| 3 | 0.125 | 5 |

Note1:
void

The values for 480 and 960 kHz may be further defined as shown in Table 36.

TABLE 36

| μ | NR Slot length (ms) | Interruption length X (slots) |
|---|---|---|
| 5 | 0.03125 | 17 |
| 6 | 0.015625 | 33 |

When $T_{proc,2}$ is calculated for the 480 and/or 960 kHz SCS, $d_{2,2}$ may be used by scaling the BWP switching time in a similar way to $d_{2,1}$ or $d_2$ described above. For example, if the values in the table above are used, $d_{2,2}$ may be defined by $d_{2,2}=4*17*0.03125$ or $d_{2,2}=X3*17*0.03125$ for the 480 kHz SCS, and $d_{2,2}$ may be defined by $d_{2,2}=8*33*0.015625$ or $d_{2,2}=Y3*33*0.015625$ for the 960 kHz SCS. As another method, for the 480 and/or 960 kHz SCS, $d_{2,2}$ may be used by scaling the BWP switching time for the 120 kHz SCS. For example, $d_{2,2}$ may be defined by $d_{2,2}=4*5*0.03125$ or $d_{2,2}=X4*5*0.03125$ for the 480 kHz SCS, and $d_{2,2}$ may be defined by $d_{2,2}=8*5*0.015625$ or $d_{2,2}=Y4*5*0.015625$ for the 960 kHz SCS. In this case, the values of $X_3$, $X_4$, $Y_4$, and $Y_4$ may be predefined for each SCS. Alternatively, the values may be configured by higher layer signaling such as RRC or configured by DCI.

As another method, the BWP switching times defined for the 480 and 960 kHz SCSs may be used as $d_{2,2}$ for the 480 kHz and 960 kHz SCSs without scaling, respectively. For example, (referring to the table above), $d_{2,2}=17*0.03125$ may be applied to calculate $T_{proc,2}$ for the 480 kHz SCS, and $d_{2,2}=33*0.015625$ may be applied to calculate $T_{proc,2}$ for the 960 kHz SCS.

Additionally, when $T_{proc,2}$ is calculated for the 480 or 960 kHz SCS, the value of $T_{ext}$ and/or $T_{switch}$ may be scaled. For example, $T_{ext}$ or $T_{switch}$ may have a non-zero value depending on specific situations (or when specific conditions are satisfied). When $T_{proc,2}$ is calculated for the 480 or 960 kHz SCS, the scaled value may be used instead of using the original value as it is. In this case, the value of $T_{ext}$ and/or $T_{switch}$ may be scaled 4 times for 480 kHz and 8 times for 960 kHz in a similar way to $d_{2,1}$, $d_{2,2}$, and $d_2$. Alternatively, the value of $T_{ext}$ and/or $T_{switch}$ may be scaled a predefined value or RRC configured value.

The methods of scaling the values of $d_{2,1}$, $d_{2,2}$, $d_2$, $T_{ext}$, and/or $T_{switch}$ to calculate $T_{proc,2}$ may be applied to all or part of the $T_{proc,2}$ calculation. For example, $d_{2,1}$ is scaled 4 or 8 times depending on the SCS and then applied to the $T_{proc,2}$ calculation, and $d_{2,2}$, $d_2$, $T_{ext}$, or $T_{switch}$ may be used in the calculation as it is.

The methods of scaling the values of $d_{2,1}$, $d_{2,2}$, and/or $d_2$ may be applied regardless of PUSCH scheduling. For example, the methods may be applied even when there is one PUSCH scheduled by single DCI, and the methods may be equally applied when a plurality of PUSCHs are scheduled by single DCI.

1.12. HARQ Feedback Timing Indicator Field in Success RAR

The values of a PDSCH-to-HARQ_feedback timing indicator field, which is a 3-bit field in DCI format 1_0, is defined as {1, 2, 3, 4, 5, 6, 7, 8} regardless of SCSs below 120 kHz. However, it is agreed by RAN1 #107-e meeting that the values of the PDSCH-to-HARQ_feedback timing indicator field are determined as {7, 8, 12, 16, 20, 24, 28, 32} for 480 kHz and {13, 16, 24, 32, 40, 48, 56, 64} for 960 kHz in order to indicate larger values (while using the same three bits).

It is defined in Clause 8.2A (Random access response—Type-2 random access procedure) of TS 38.213 that when the UE detects DCI format 1_0 CRC scrambled with a MsgB-RNTI and receives a PDSCH related thereto, if an RAR message is a success RAR, the UE determines the location of a PUCCH slot for HARQ-ACK transmission based on the value of a HARQ feedback timing indicator field, which is a 3-bit field in the corresponding success RAR. Table 37 is extracted from Clause 8.2A of TS 38.213.

TABLE 37

If the UE detects the DCI format 1_0, with CRC scrambled by the corresponding MsgB-RNTI and LSBs of a SFN field in the DCI format 1_0, if applicable, are same as corresponding LSBs of the SFN where the UE transmitted PRACH, and the UE receives a transport block in a corresponding PDSCH within the window, the UE passes the transport block to higher layers. The higher layers indicate to the physical layer
- an uplink grant if the RAR message(s) is for fallbackRAR and a random access preamble identity (RAPID) associated with the PRACH transmission is identified, and the UE procedure continues as described in clauses 8.2, 8.3, and 8.4 when the UE detects a RAR UL grant, or
- transmission of a PUCCH with HARQ-ACK information having ACK value if the RAR message(s) is for successRAR, where
  - a PUCCH resource for the transmission of the PUCCH is indicated by PUCCH resource indicator field of 4 bits in the successRAR from a PUCCH resource set that is provided by pucch-ResourceCommon
  - a slot for the PUCCH transmission is indicated by a HARQ Feedback Timing Indicator field of 3 bits in the successRAR having a value k from {1, 2, 3, 4, 5, 6, 7, 8} and, with reference to slots for PUCCH transmission having duration $T_{slot}$, the slot is determined as n + k + Δ, where n is a slot of the PDSCH reception and Δ is as defined for PUSCH transmission in Table 6.1.2.1.1-5 of [6, TS 38.214]
    - the UE does not expect the first symbol of the PUCCH transmission to be after the last symbol of the PDSCH reception by a time smaller than $N_{T,1}$ + 0.5 msec where $N_{T,1}$ is the PDSCH processing time for UE processing capability 1 [6, TS 38.214]
  - for operation with shared spectrum channel access, a channel access type and CP extension [15, TS 37.213] for a PUCCH transmission is indicated by a ChannelAccess-CPext field in the successRAR as defined in Table 7.3.1.1.1-4 in TS 38.212 or Table 7.3.1.1.1-4A in TS 38.212 if ChannelAccessMode-r16 = "semistatic" is provided
  - the PUCCH transmission is with a same spatial domain transmission filter and in a same active UL BWP as a last PUSCH transmission
If the UE detects the DCI format 1_0 with CRC scrambled by a C-RNTI and a transport block in a corresponding PDSCH within the window, the UE transmits a PUCCH with HARQ-ACK information having ACK value if the UE correctly detects the transport block or NACK value if the UE incorrectly detects the transport block and the time alignment timer is running [11, TS 38.321].

The definition of each field of the success RAR are given in Clause 6.1.5a of TS 38.321. The HARQ feedback timing indicator is defined as the "PDSCH-to-HARQ feedback timing indicator field" for MSGB HARQ feedback, and specific values thereof are determined according to Clause 8.2A of TS 38.213. Accordingly, the location of a PUCCH slot for MSGB HARQ feedback in the 2-step RACH procedure is determined as n+k+Δ, where n is the index of a slot in which a PDSCH is received, k is {1, 2, 3, 4, 5, 6, 7, 8}, and Δ is a time margin for PUSCH transmission. In particular, Δ is defined in Table 6.1.2.1.1-5 of TS 38.214. In addition, it is agreed by RAN1 #107-e meeting that Δ=24 for 480 kHz and Δ=48 for 960 kHz.

In this situation, if the conventional values of {1, 2, 3, 4, 5, 6, 7, 8} are used for the 480 and/or 960 kHz SCS when determining the location of a slot for HARQ feedback transmission, the location of slot n for receiving a PDSCH including an RAR message may be significantly restricted in order to align the corresponding slot position with UL slots. The reason for this is that if UL:DL=1:4, there may be no UL slot during 16 slots for the 480 kHz SCS (32 slots for 960 kHz) because the slot configuration for the 480 and/or 960 kHz SCS is likely to be aligned with the semi-static UL-DL configuration for the 120 kHz SCS. Therefore, the values of k may also need to be changed such that k have large values similarly to the values of the PDSCH-to-HARQ_feedback timing indicator field of DCI format 1_0 for 480/960 kHz.

The value of Δ defined for 480/960 kHz is determined based on a time corresponding to N1 (i.e., PDSCH processing time) for the corresponding SCS and a value for covering a time to deliver an RAR message to higher layers. Therefore, if the values of the PDSCH-to-HARQ_feedback timing indicator field of DCI format 1_0 for 480/960 kHz described above are used to determine the location of the PUCCH slot for MSGB HARQ feedback, the values of N1 for the corresponding SCS may be redundantly added.

Considering all these aspects, the value of k for calculating the PUCCH slot location, n+k+Δ for MSGB HARQ feedback in the 2-step RACH procedure may be determined as one of the following values.

480 kHz: {7, 8, 12, 16, 20, 24, 28, 32} and 960 kHz: {13, 16, 24, 32, 40, 48, 56, 64}

These values are the same as the values of the PDSCH-to-HARQ_feedback timing indicator field for DCI format 1_0. Although the above operation has inefficiency in adding the values of N1 redundantly, there is an advantage of using uniform values for 480/960 kHz.

480 kHz: {1, 2, 6, 10, 14, 18, 22, 26} and 960 kHz: {1, 4, 12, 20, 28, 36, 42, 50}

These values are obtained by subtracting the time equivalent to N1 for the corresponding SCS from the first candidate values. Specifically, the values may be reduced by floor (N1/14) (or by ceil (N1/14)-1). If the smallest value is set to 1, it is possible to indicate a first slot after a lapse of Δ from PDSCH reception.

480 kHz: {0, 1, 5, 9, 13, 17, 21, 25} and 960 kHz: {0, 3, 11, 19, 27, 35, 41, 49}

These values are obtained by subtracting the time equivalent to N1 for the corresponding SCS from the first candidate values. Specifically, the values may be reduced by ceil (N1/14). The smallest value of 0 is to allow indication of the last slot in a duration of Δ after PDSCH reception.

480 kHz: {1, 5, 9, 13, 17, 21, 25, 29} and 960 kHz: {1, 9, 17, 25, 33, 41, 49, 57}

These values are to allow indication of a first slot after a lapse of Δ from PDSCH reception, which are obtained by fixing the interval between indication values to 4 or 8. The reason why the interval is fixed to 4/8 is because for the corresponding SCS, 4/8 corresponds to one slot length for the 120 kHz SCS.

480 kHz: {4, 8, 12, 16, 20, 24, 28, 32} and 960 kHz: {8, 16, 24, 32, 40, 48, 56, 64}

These values are obtained by fixing the interval between indication values to 4 or 8 from the last slot in a duration of Δ after PDSCH reception.

480 kHz: {1, 4, 8, 12, 16, 20, 24, 28} and 960 kHz: {1, 8, 16, 24, 32, 40, 48, 56}

These values are to allow indication of a first slot after a lapse of Δ from PDSCH reception, which are obtained by reducing the maximum indication value to 28 or 56.

480 kHz: {1, 8, 12, 16, 20, 24, 28, 32} and 960 kHz: {1, 16, 24, 32, 40, 48, 56, 64}

These values are to allow indication of a first slot after a lapse of Δ from PDSCH reception, which are obtained by maintaining the maximum indication value as 32 or 64.

Additionally, the minimum and maximum of the candidate values listed above (8 values) are particularly important because the minimum and maximum correspond to a range in which the PUCCH slot for MSGB HARQ feedback may be located. When fast MSGB HARQ feedback is required, the value of k may be determined such that the minimum value of "1" is included. By doing so, the feedback may be transmitted as quickly as possible from the PDSCH reception time.

Further, to remove the inefficiency that N1 is redundantly considered to determine the PUCCH slot location, n+k+Δ for the 480 and/or 960 kHz SCS, the number of slots corresponding to 0.5 msec may be used instead of Δ. Since 0.5 msec corresponds to 16 slots for the 480 kHz SCS and 32 slots for the 960 kHz SCS, the PUCCH slot location for MSGB HARQ feedback may be determined as n+k+16 for the 480 kHz SCS and n+k+32 for the 960 kHz SCS in the 2-step RACH procedure (where n is a slot for PDSCH reception, and k is one of the above-described 7 candidate values). Alternatively, by giving a margin (of one slot for 120 kHz), the PUCCH slot location may be determined as n+k+20 for the 480 kHz SCS and n+k+40 for the 960 kHz SCS.

The contents of the present disclosure are not limitedly applied only to UL and/or DL signal transmission and reception. For example, the contents of the present disclosure may also be used for direct communication between UEs. In this document, the term based station (BS) may be understood as a concept including a relay node as well as a BS. For example, the operations of a BS described in the present disclosure may be performed by a relay node as well as the BS.

It is obvious that each of the examples of the proposed methods may also be included as one implementation method of the present disclosure, and thus each example may be regarded as a kind of proposed method. Although the above-described proposed methods may be implemented independently, some of the proposed methods may be combined and implemented. In addition, it may be regulated that information on whether the proposed methods are applied (or information on rules related to the proposed methods) is transmitted from the BS to the UE in a predefined signal (e.g., physical layer signaling or higher layer signaling).

Implementation Examples

Figure 9:
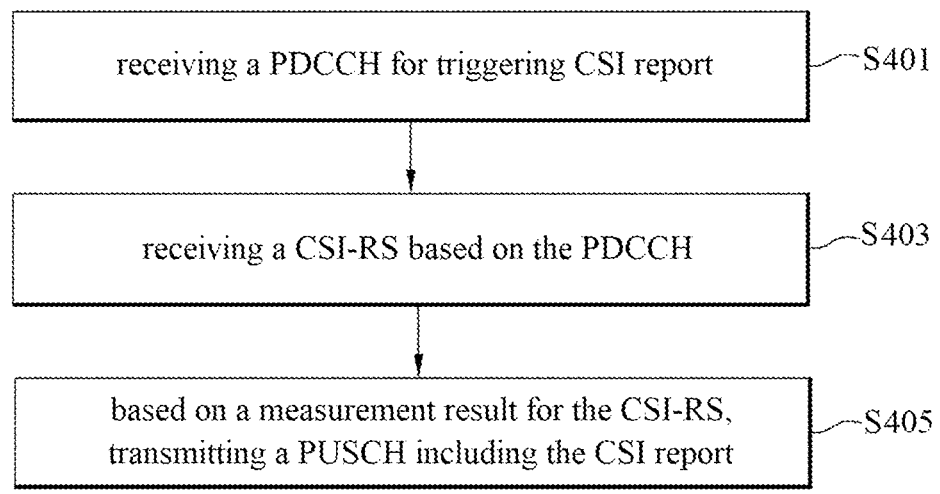

FIG. 9 is a flowchart of a signal transmission and reception method according to embodiments of the present disclosure.

Referring to FIG. 9, the embodiments of the present disclosure may be performed by a UE. The embodiments may include: receiving a PDCCH for triggering a CSI report (S401); receiving a CSI-RS based on the PDCCH (S403 and transmitting a PUSCH including the CSI report based on a measurement result for the CSI-RS (S405).

In addition to the operations of FIG. 9, one or more of the operations described in Section 1 may be additionally performed.

For example, referring to Sections 1.5 to 1.9, the CSI report may be an aperiodic CSI report. Referring to Section 1.8, $\mu_{PDCCH}$ is an SCS configuration of the PDCCH including DCI for triggering CSI, which may be represented as a first SCS configuration. In addition, $\mu_{CSI-RS}$ is the smallest value among SCS configurations of A-CSI-RSs triggered by DCI, which may be represented as a second SCS configuration. Further, $\mu_{UL}$ is an SCS configuration of a PUSCH for transmitting a CSI report, which may be represented as a third SCS configuration.

Referring to Method 1.8-2a, when at least one of the first SCS configuration, the second SCS configuration, and the third SCS configuration is 5 or 6, when the PUSCH include no HARQ-ACK or TB, and when there is no CPU occupied by the UE, CSI computation delay requirement 2 of Table 20 is used, and CSI computation delay requirement 1 of Table 17 is not used.

Referring to Table 19, when no HARQ-ACK or TB is included in the PUSCH and when there is no CPU occupied by the UE, CSI computation delay requirement 1 of Table 17 is used. According to the present disclosure, operations are changed when at least one of the first SCS configuration, the second SCS configuration, and the third SCS configuration is 5 or 6. Thus, CSI computation delay requirement 1 is used when the first SCS configuration, the second SCS configuration, and the third SCS configuration do not have a value of 5 or 6, that is, when the maximum value of the first SCS configuration, the second SCS configuration, and the third SCS configuration is less than or equal to 3.

Referring to Table 17, CSI computation delay requirement 1 consists of a combination of Z and Z' for each SCS for the lowest latency (ultra-low latency). Referring to Table 20, CSI computation delay requirement 2 consists of a combination of Z and Z' for each SCS for higher latency than CSI computation delay requirement 1.

Referring to Table 15, Z is the number of symbols of the gap between the last symbol of the PDCCH triggering the CSI report and a next UL symbol (i.e., the starting symbol of the PUSCH), and Z' is the number of symbols of the gap between the last symbol of a last received signal among an A-CSI-RS resource, an aperiodic CSI-IM, and an aperiodic NZP CSI-RS and a next UL symbol (i.e., the starting symbol of the PUSCH). If there are no other signals received between the A-CSI-RS and the PUSCH, Z' corresponds to the number of symbols of the gap between the last symbol of the CSI-RS and the starting symbol of the PUSCH.

Referring to Method 1.9-2, when at least one of the first SCS configuration, the second SCS configuration, and the third SCS configuration is 5 or 6, when the PUSCH includes no HARQ-ACK or TB, and when there is no CPU occupied by the UE, the CSI report occupies as many CPUs as the number of CSI-RS resources in a CSI-RS resource set for channel measurement among all CPUs ($N_{CPU}$) available to the UE ($O_{CPU}=K_s$).

Referring to Table 21, when no HARQ-ACK or TB is included in the PUSCH and when there is no CPU occupied by the UE, the CSI report occupies all CPUs available to the UE ($O_{CPU}=N_{CPU}$). According to the present disclosure, operations are changed when at least one of the first SCS configuration, the second SCS configuration, and the third SCS configuration is 5 or 6. The CSI report is allowed to occupy all available CPUs when the first SCS configuration, the second SCS configuration, and the third SCS configuration do not have a value of 5 or 6, that is, when the maximum value of the first SCS configuration, the second SCS configuration, and the third SCS configuration is less than or equal to 3.

Referring to Section 1.1, the gap between a first slot in which a PUCCH including a HARQ-ACK is transmitted and a second slot in which a PDSCH related to the HARQ-ACK is received may be determined based on the slot offset K1. The value of a DCI field (K1 field) for indicating K1 may include 7 when the SCS configuration of the PUCCH is 5. In addition, the value of DCI field may include 13 when the SCS configuration of the PUCCH is 6. Referring to Table 9, when the SCS configuration of the PUCCH is 5, N1 may be 80. Thus, according to 1.1-(1), when the SCS configuration of the PUCCH is 5, the value of the K1 field may be set to ceil (80/14)+1=7. Similarly, when the SCS configuration of the PUCCH is 6, N1 may be 160, and thus the value of the K1 field may be set to ceil (160/14)+1=13.

Referring to Section 1.4, the gap between a first slot in which a PUSCH including a TB is transmitted and a second slot in which DCI scheduling the PUSCH including the TB is received may be determined based on the slot offset K2. According to 1.4-(1), K2 may be determined based on the value of ceil (N2/c), and the value of ceil (N2/c) may be expressed as a specific value j. Referring to Table 34, when the SCS configuration of the PUSCH including the TB is 5, N2 may be 144. Accordingly, when the SCS configuration of the PUSCH including the TB is 5, the specific value j may be ceil (144/14)=11. Similarly, when the SCS configuration of the PUSCH including the TB is 6, N2 may be 288, and thus, the specific value j may be ceil (288/14)=21.

In addition to the operations described with reference to FIG. 9, the operations described with reference to FIGS. 1 to 8 and/or one or more of the operations described in Section 1 may be combined and further performed.

Example of Communication System to Which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 10:
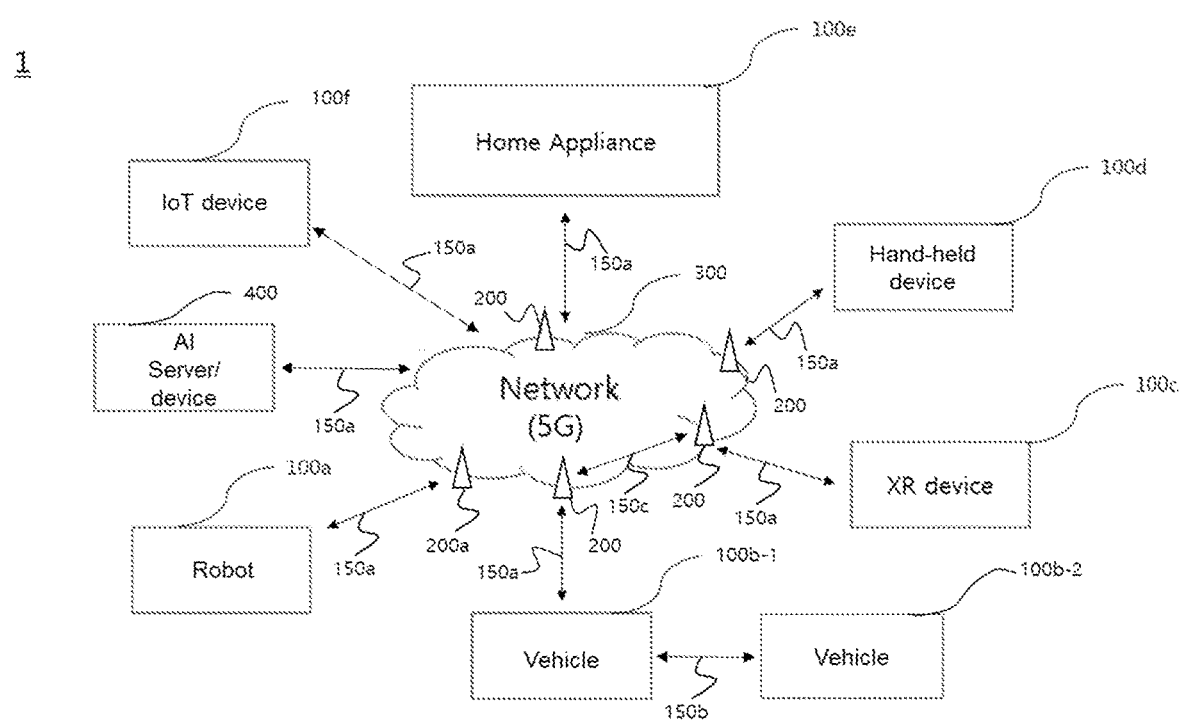
FIGS. 10 to 13 illustrate devices according to an embodiment of the present disclosure.

FIG. 10 illustrates a communication system 1 applied to the present disclosure.

Referring to FIG. 10, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-b1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HIVID), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the B Ss 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to Which the Present Disclosure is Applied

Figure 11:
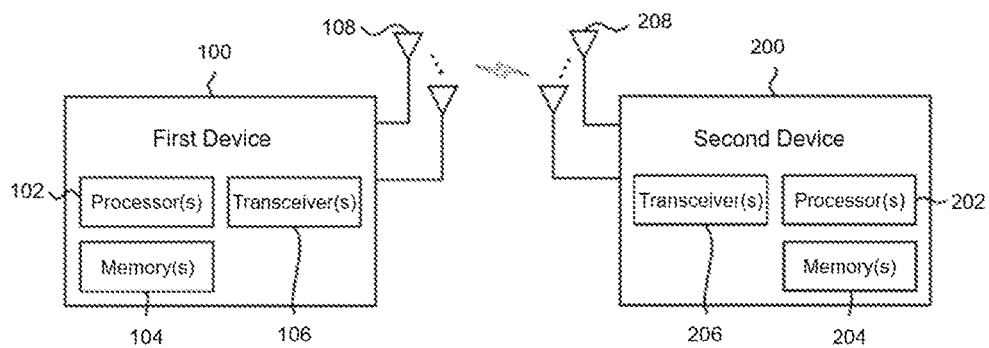

FIG. 11 illustrates wireless devices applicable to the present disclosure.

Referring to FIG. 11, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 10.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to Which the Present Disclosure is Applied

Figure 12:
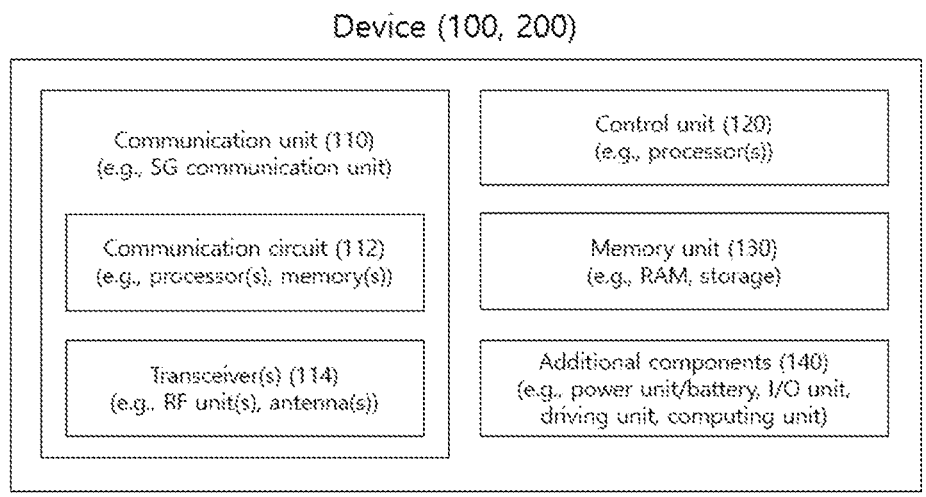

FIG. 12 illustrates another example of a wireless device applied to the present disclosure. The wireless device may be implemented in various forms according to a use case/service (refer to FIG. 10).

Referring to FIG. 12, wireless devices 100 and 200 may correspond to the wireless devices 100 and 200 of FIG. 11 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 10), the vehicles (100b-1 and 100b-2 of FIG. 10), the XR device (100c of FIG. 10), the hand-held device (100d of FIG. 10), the home appliance (100e of FIG. 10), the IoT device (100f of FIG. 10), a digital broadcasting terminal, a hologram device, a public safety device, an MTC device, a medical device, a FinTech device (or a finance device), a security device, a climate/environment device, the AI server/device (400 of FIG. 10), the BSs (200 of FIG. 10), a network node, or the like. The wireless device may be mobile or fixed according to a use case/service.

In FIG. 12, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 13:
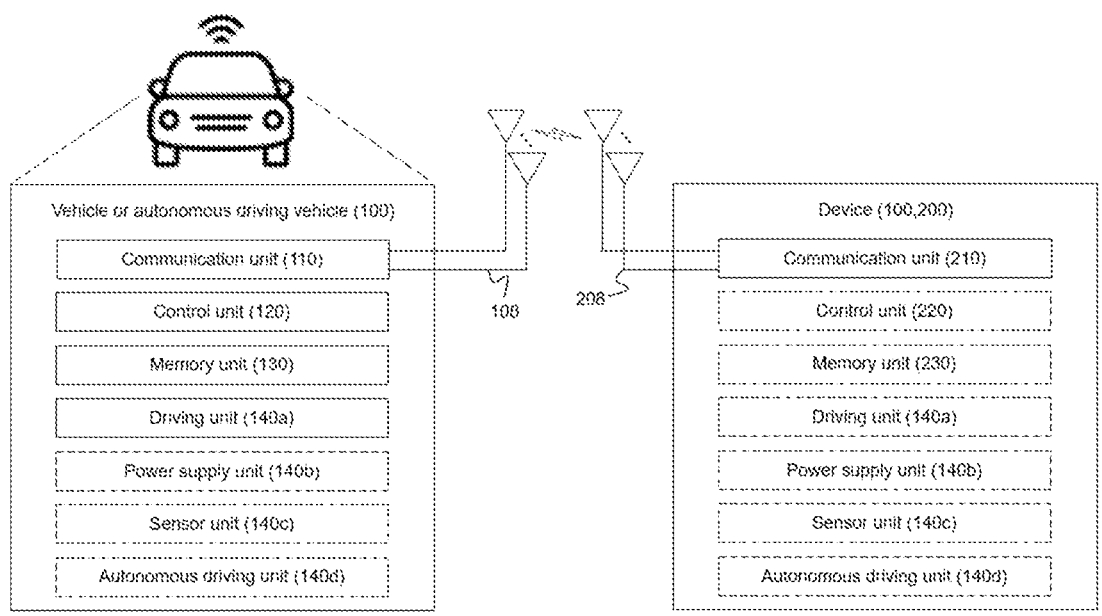

Example of Vehicle or Autonomous Driving Vehicle to Which the Present Disclosure is Applied FIG. 13 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 13, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 12, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

The invention claimed is:

1. A method of transmitting and receiving a signal by a user equipment (UE) operating in a wireless communication system, the method comprising:

receiving a physical downlink control channel (PDCCH) triggering an aperiodic channel state information (CSI) report;

receiving a channel state information reference signal (CSI-RS) based on the PDCCH; and transmitting a physical uplink shared channel (PUSCH) including the CSI report based on a measurement result of the CSI-RS, wherein a first subcarrier spacing (SCS) configuration is used for the PDCCH, and a second SCS configuration is used for the CSI-RS, and a third SCS configuration is used for the PUSCH, and wherein CSI computation delay requirement 1 is used for the CSI report based on (i) the first SCS configuration, the second SCS configuration, and the third SCS configuration being equal to or less than 3, (ii) CSI being triggered, (iii) there being no CSI processing unit (CPU) occupied by the UE, (iv) the CSI corresponding to a single CSI with wideband frequency-granularity, and (v) the CSI corresponding to at most 4 CSI-RS ports in a single resource without CSI-RS report indicator (CRI) report and CodebookType being set to 'typeI-SinglePanel' or where reportQuantity is set to 'cri-RI-CQI', and wherein CSI computation delay requirement 2 is used for the CSI report based on at least one of the first SCS configuration, the second SCS configuration, and the third SCS configuration being 5 or 6.

2. The method of claim 1, wherein no HARQ-ACK or a transport block (TB) is multiplexed with the PUSCH on which the CSI report is transmitted.

3. The method of claim 2, wherein a number of symbols related to a time gap between a last symbol of the PDCCH and a starting symbol of the PUSCH is Z,
wherein a number of symbols related to a time gap between a last symbol of the CSI-RS and the starting symbol of the PUSCH is Z', and
wherein CSI computation delay requirements 1 and 2 are comprised of a combination of Z and Z' for each SCS configuration.

4. The method of claim 2, wherein the CSI report occupies as many CPUs as a number of CSI-RS resources in a CSI-RS resource set for channel measurement among all CPUs available to the UE based on (i) the PUSCH not including the TB or the HARQ-ACK, (ii) there being no CPU occupied by the UE, and (iii) the at least one of the first SCS configuration, the second SCS configuration, and the third SCS Configuration being 5 or 6.

5. The method of claim 2, wherein the CSI report occupies all CPUs available to the UE based on (i) the PUSCH not including the TB or the HARQ-ACK, (ii) there being no CPU occupied by the UE, and (iii) the maximum value of the first SCS configuration, the second SCS configuration, and the third SCS Configuration being smaller than or equal to 3.

6. The method of claim 1, wherein a value of a downlink control information (DCI) field for indicating a slot gap between a first slot in which a physical uplink control channel (PUCCH) including the HARQ-ACK is transmitted and a second slot in which a physical downlink shared channel (PDSCH) related to the HARQ-ACK is received is 7 based on a SCS configuration for the PUCCH including the HARQ-ACK being 5, and
wherein the value of the DCI field is 13 based on a SCS configuration for the PUCCH including the HARQ-ACK being 6.

7. The method of claim 2, wherein a specific value for determining a slot gap between a first slot in which a PUSCH including the TB is transmitted and a second slot in which downlink control information (DCI) scheduling the PUSCH including the TB is received is 11 based on a SCS configuration for the PUSCH including the TB being 5, and
wherein the specific value is 21 based on a SCS configuration for the PUSCH including the TB being 6.

8. A user equipment (UE) configured to transmit and receive a signal in a wireless communication system, the UE comprising:
at least one transceiver;
at least one processor; and
at least one memory operatively coupled to the at least one processor and configured to store instructions that, when executed, cause the at least one processor to perform operations comprising:
receiving a physical downlink control channel (PDCCH) triggering an aperiodic channel state information (CSI) report;
receiving a channel state information reference signal (CSI-RS) based on the PDCCH; and
transmitting a physical uplink shared channel (PUSCH) including the CSI report based on a measurement result of the CSI-RS,
wherein a first subcarrier spacing (SCS) configuration is used for the PDCCH, and a second SCS configuration is used for the CSI-RS, and a third SCS configuration is used for the PUSCH, and
wherein CSI computation delay requirement 1 is used for the CSI report based on (i) the first SCS configuration, the second SCS configuration, and the third SCS configuration being equal to or less than 3, (ii) CSI being triggered, (iii) there being no CSI processing unit (CPU) occupied by the UE, (iv) the CSI corresponding to a single CSI with wideband frequency-granularity, and (v) the CSI corresponding to at most 4 CSI-RS ports in a single resource without CSI-RS report indicator (CRI) report and CodebookType being set to 'typeI-SinglePanel' or where reportQuantity is set to 'cri-RI-CQI', and
wherein CSI computation delay requirement 2 is used for the CSI report based on at least one of the first SCS configuration, the second SCS configuration, and the third SCS configuration being 5 or 6.

9. The UE of claim 8, wherein no HARQ-ACK or a transport block (TB) is multiplexed with the PUSCH on which the CSI report is transmitted.

10. The UE of claim 8, wherein a number of symbols related to a time gap between a last symbol of the PDCCH and a starting symbol of the PUSCH is Z,
wherein a number of symbols related to a time gap between a last symbol of the CSI-RS and the starting symbol of the PUSCH is Z', and
wherein CSI computation delay requirements 1 and 2 are comprised of a combination of Z and Z' for each SCS configuration.

11. The UE of claim 8, wherein the CSI report occupies as many CPUs as a number of CSI-RS resources in a CSI-RS resource set for channel measurement among all CPUs available to the UE based on (i) the PUSCH not including the TB or the HARQ-ACK, (ii) there being no CPU occupied by the UE, and (iii) the at least one of the first SCS configuration, the second SCS configuration, and the third SCS Configuration being 5 or 6.

12. The UE of claim 9, wherein the CSI report occupies all CPUs available to the UE based on (i) the PUSCH not including the TB or the HARQ-ACK, (ii) there being no CPU occupied by the UE, and (iii) the maximum value of the first SCS configuration, the second SCS configuration, and the third SCS Configuration being smaller than or equal to 3.

13. The UE of claim 8, wherein a value of a downlink control information (DCI) field for indicating a slot gap between a first slot in which a physical uplink control channel (PUCCH) including the HARQ-ACK is transmitted and a second slot in which a physical downlink shared channel (PDSCH) related to the HARQ-ACK is received is 7 based on a SCS configuration for the PUCCH including the HARQ-ACK being 5, and
wherein the value of the DCI field is 13 based on a SCS configuration for the PUCCH including the HARQ-ACK being 6.

14. The UE of claim 8, wherein a specific value for determining a slot gap between a first slot in which a PUSCH including the TB is transmitted and a second slot in which downlink control information (DCI) scheduling the PUSCH including the TB is received is 11 based on a SCS configuration for the PUSCH including the TB being 5, and
wherein the specific value is 21 based on a SCS configuration for the PUSCH including the TB being 6.

15. An apparatus for a user equipment (UE), the apparatus comprising:
at least one processor; and
at least one computer memory operatively coupled to the at least one processor and configured to, when executed, cause the at least one processor to perform operations comprising:

receiving a physical downlink control channel (PDCCH) triggering an aperiodic channel state information (CSI) report;

receiving a channel state information reference signal (CSI-RS) based on the PDCCH; and transmitting a physical uplink shared channel (PUSCH) including the CSI report based on a measurement result of the CSI-RS, wherein a first subcarrier spacing (SCS) configuration is used for the PDCCH, and a second SCS configuration is used for the CSI-RS, and a third SCS configuration is used for the PUSCH, and wherein CSI computation delay requirement 1 is used for the CSI report based on (i) the first SCS configuration, the second SCS configuration, and the third SCS configuration being equal to or less than 3, (ii) CSI being triggered, (iii) there being no CSI processing unit (CPU) occupied by the UE, (iv) the CSI corresponding to a single CSI with wideband frequency-granularity, and (v) the CSI corresponding to at most 4 CSI-RS ports in a single resource without CSI-RS report indicator (CRI) report and CodebookType being set to 'typeI-SinglePanel' or where reportQuantity is set to 'cri-RI-CQI', and wherein CSI computation delay requirement 2 is used for the CSI report based on at least one of the first SCS configuration, the second SCS configuration, and the third SCS configuration being 5 or 6.

16. The apparatus of claim 15, wherein no HARQ-ACK or a transport block (TB) is multiplexed with the PUSCH on which the CSI report is transmitted.

* * * * *